(12) United States Patent
Leppänen et al.

(10) Patent No.: US 11,169,598 B2
(45) Date of Patent: Nov. 9, 2021

(54) APPARATUS AND ASSOCIATED METHODS FOR PRESENTATION OF A VIRTUAL REALITY SPACE

(71) Applicant: Nokia Technologies Oy, Espoo (FI)

(72) Inventors: Jussi Artturi Leppänen, Tampere (FI); Sujeet Shyamsundar Mate, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/733,548

(22) Filed: Jan. 3, 2020

(65) Prior Publication Data
US 2020/0218337 A1 Jul. 9, 2020

(30) Foreign Application Priority Data

Jan. 9, 2019 (EP) ..................................... 19151039

(51) Int. Cl.
*G06F 3/01* (2006.01)
*G06T 19/00* (2011.01)

(52) U.S. Cl.
CPC ............ *G06F 3/011* (2013.01); *G06T 19/003* (2013.01)

(58) Field of Classification Search
CPC ........ G06F 3/01; G06F 3/011; G06F 3/04815; G09G 3/003; G06T 19/003; G06T 19/006
See application file for complete search history.

(56) References Cited

U.S. PATENT DOCUMENTS

| | | | | |
|---|---|---|---|---|
| 2011/0119640 | A1* | 5/2011 | Berkes | G06F 3/017 715/863 |
| 2018/0061127 | A1* | 3/2018 | Gullicksen | G06F 3/0383 |
| 2018/0350144 | A1* | 12/2018 | Rathod | G06Q 20/3276 |

FOREIGN PATENT DOCUMENTS

WO 2017/201009 A2 11/2017

OTHER PUBLICATIONS

Extended European Search Report received for corresponding European Patent Application No. 19151039.5, dated May 24, 2019, 9 pages.
Cenydd et al., "Movement Modalities in Virtual Reality: A Case Study from Ocean Rift Examining the Best Practices in Accessibility, Comfort, and Immersion", IEEE Consumer Electronics Magazine, vol. 8, No. 1, Jan. 2019, pp. 30-35.

* cited by examiner

*Primary Examiner* — Robert J Michaud
(74) *Attorney, Agent, or Firm* — Alston & Bird LLP

(57) ABSTRACT

An apparatus configured to: present a virtual reality space having at least one defined and non-defined region; control a point-of-view location and a direction-of-view orientation based on sensors configured to sense the user in a real-world play space; receive input to move by means other than said sensors; determine if the requested point-of-view location is allowed or not allowed wherein a location is not allowed if any physical locations in the play space correspond to point-of-view locations in the virtual reality space that lie within a non-defined region and if the requested point-of-view location is not allowed, determine at least one of: (i) a compromise point-of-view location; (ii) a compromise direction-of-view orientation; (iii) a compromise point-of-view location and direction-of-view orientation; (iv) a compromise physical position of the user in the real-world play (Continued)

space; and present the virtual reality space from/with the at least one of (i), (ii), (iii) and (iv).

16 Claims, 7 Drawing Sheets

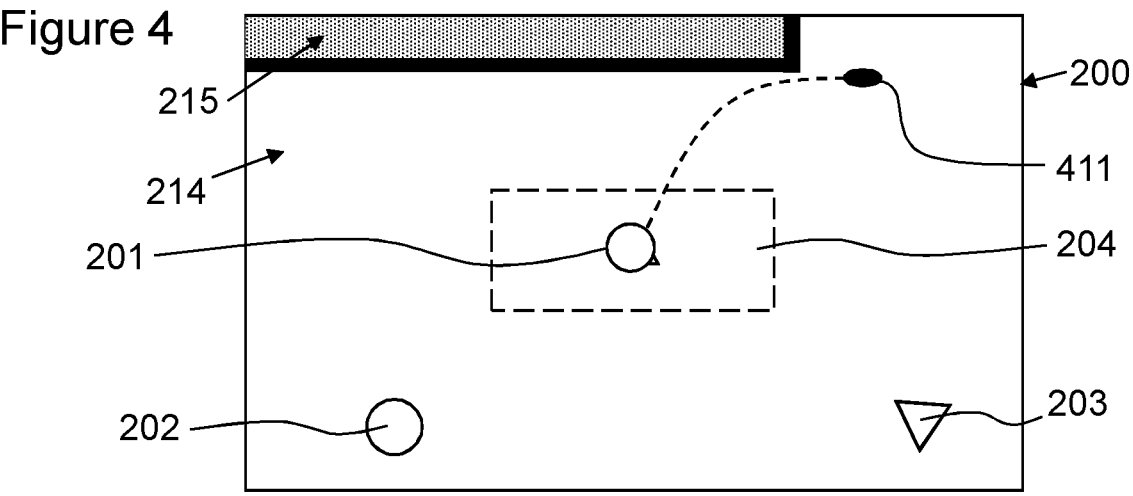
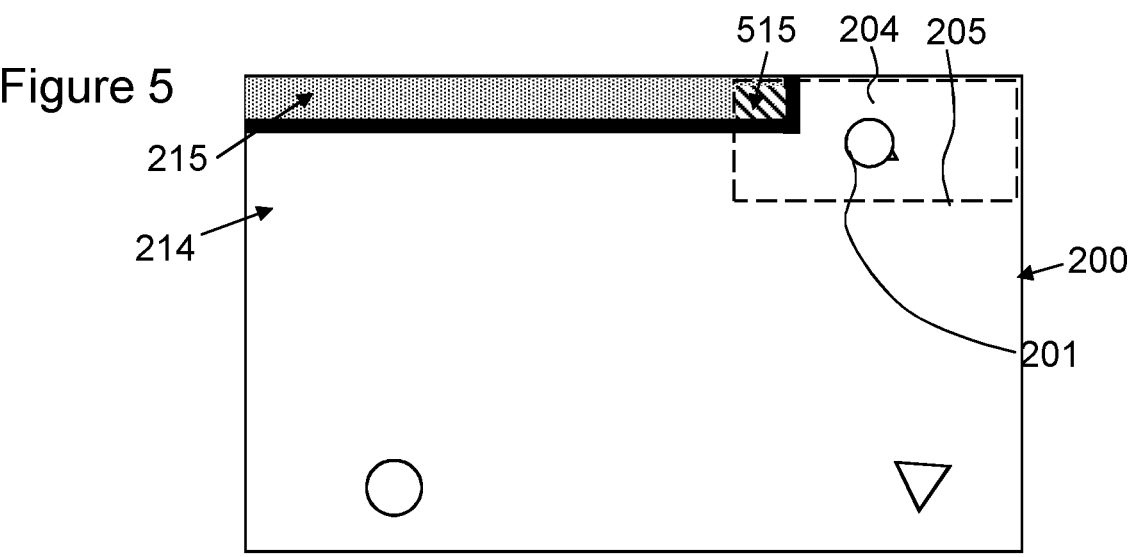
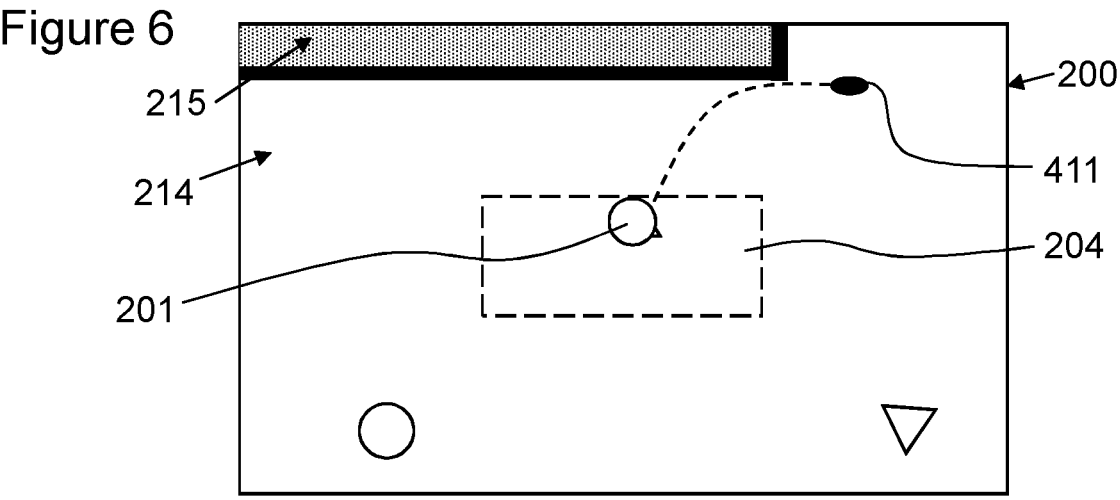

APPARATUS AND ASSOCIATED METHODS FOR PRESENTATION OF A VIRTUAL REALITY SPACE

TECHNICAL FIELD

The present disclosure relates to the field of presentation of virtual reality. In particular, it is related to the presentation of a virtual reality space and the movement between point-of-view locations within said virtual reality space, associated apparatus, methods and computer programs.

BACKGROUND

Apparatus for the presentation of virtual reality spaces or "worlds" is becoming common, with content creators providing more and more content for exploration. The exploration of virtual reality spaces and, in particular, large virtual spaces may be difficult.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus comprising means configured to:
provide for presentation, using a virtual reality apparatus, of a virtual reality space from a point-of-view location in the virtual reality space and with a direction-of-view orientation in the virtual reality space, the virtual reality space having at least one defined region and at least one non-defined region;
control the position of the point-of-view location and the direction-of-view orientation in the virtual reality space based on signalling from one or more sensors configured to determine a respective and corresponding physical position and physical orientation of a user within a boundary of a real-world play space;
receive input to move the point-of-view location in the virtual reality space to a requested point-of-view location by means other than said sensed physical position and physical orientation of the user in the real-world play space;
determine if the requested point-of-view location is allowed or not allowed based on information indicative of the current physical location of the user in the real-world play space and the boundary of the real-world play space, wherein a location in the virtual space is not allowed if any physical locations within the boundary of the real-world play space relative to the current physical location of the user correspond to point-of-view locations in the virtual reality space relative to said location in the virtual space that lie within a non-defined region of the virtual reality space, and wherein a location in the virtual space is allowed if all physical locations within the boundary of the real-world play space relative to the current physical location of the user correspond to point-of-view locations in the virtual reality space relative to said location in the virtual space that are wholly within the defined region of the virtual reality space, and if the requested point-of-view location is not allowed, determine at least one of:
  (i) a compromise point-of-view location in the virtual reality space comprising a location in the virtual reality space determined based on the requested point-of-view location and that is allowed;
  (ii) a compromise direction-of-view orientation in the virtual reality space comprising an orientation determined based on the direction-of-view orientation at the time the input is received and with which the requested point-of-view location is allowed;
  (iii) a compromise point-of-view location and a compromise direction-of-view orientation in the virtual reality space comprising a location and orientation determined based on the requested point-of-view location and the direction-of-view orientation at the time the input is received and wherein the compromise point-of-view location in combination with the compromise direction-of-view orientation is allowed;
  (iv) a compromise physical position of the user in the real-world play space at which the requested point-of-view location is allowed, wherein the requested point-of-view location is allowed if all physical locations within the boundary of the real-world play space relative to the compromise physical location of the user correspond to point-of-view locations in the virtual reality space that are wholly within the defined region of the virtual reality space;
  and provide for presentation, using the virtual reality apparatus, of the virtual reality space respectively from the at least one of (i) compromise point-of-view location in the virtual reality space, (ii) requested point-of-view location with the compromise direction-of-view orientation; (iii) compromise point-of-view location with the compromise direction-of-view orientation and (iv) the requested point-of-view location based on signalling indicative of the user having moved to the compromise physical position.

In one or more examples the boundary may be defined by one or both of a physical barrier in the play space or a spatial extent over which the one or more sensors are configured to sense the physical position and physical orientation of the user.

In one or more examples, the virtual reality space is larger in spatial extent than the spatial extent of the point-of-view locations reachable by the signalling due to movement of said physical position of the user within the boundary of the real-world play space.

In one or more examples, the apparatus may be configured to present an indicator indicating the difference between the at least one of:
  (i) the compromise point-of-view location and the requested point-of-view location; and
  (ii) the compromise direction-of-view orientation and the direction-of-view orientation at the time the input is received;
  (iii) the compromise point-of-view location and the requested point-of-view location; and the compromise direction-of-view orientation and the direction-of-view orientation at the time the input is received.

In one or more examples, said presentation of the indicator is provided after said presentation, using the virtual reality apparatus, of the virtual reality space from the at least one of (i) compromise point-of-view location in the virtual reality space, (ii) requested point-of-view location with the compromise direction-of-view orientation, and (iii) the compromise point-of-view location and with the compromise direction-of-view orientation.

In one or more examples, the apparatus is configured to provide for presentation, using the virtual reality apparatus, of the virtual reality space from the not allowed, requested point-of-view location in the virtual reality space; and prior to providing control of the position of the point-of-view location and the orientation of the direction-of-view orientation based on the signalling from the one or more sensors, provide for the at least one of:

(i) presentation, using the virtual reality apparatus, of the virtual reality space from the compromise point-of-view location in the virtual reality space;

(ii) presentation, using the virtual reality apparatus, of the virtual reality space with the compromise direction-of-view orientation in the virtual reality space; and (iii) presentation, using the virtual reality apparatus, of the virtual reality space with the compromise point-of-view location and the compromise direction-of-view orientation in the virtual reality space.

In one or more examples, the apparatus is configured to:

determine a plurality of different compromise point-of-view locations in the event the requested point-of-view location is not allowed;

receive an input indicative of a selection of one of the plurality of compromise point-of-view locations by the user; and following said selection, provide for presentation, using the virtual reality apparatus, of the virtual reality space from the selected compromise point-of-view location in the virtual reality space.

In one or more examples, the apparatus is configured to, following the determination of the compromise physical position, provide for presentation of guidance in order to guide the user to the compromise physical position.

In one or more examples, the least one of;

(i) the compromise point-of-view location comprises a location closest to the requested point-of-view location and that is allowed;

(ii) the compromise direction-of-view orientation comprises an orientation closest to the direction-of-view orientation at the time the input is received and with which the requested point-of-view location is allowed;

(iii) the combination of the compromise point-of-view location and the compromise direction-of-view orientation comprise the location and orientation closest to the requested point-of-view location and closest to the direction-of-view orientation at the time the input is received and wherein the compromise point-of-view location in combination with the compromise direction-of-view orientation is allowed;

(iv) the compromise physical position of the user in the real-world play space comprises a position closest to physical position of the user at the time the input is received and at which the requested point-of-view location is allowed.

In one or more examples, the apparatus is configured to, upon determination that the requested point-of-view location is not allowed, provide for said presentation, using the virtual reality apparatus, of the virtual reality space from the at least one of (i) compromise point-of-view location in the virtual reality space, (ii) requested point-of-view location with the compromise direction-of-view orientation; (iii) compromise point-of-view location with the compromise direction-of-view orientation and (iv) the requested point-of-view location, absent of any feedback for the user indicative of the requested point-of-view location being not allowed.

In one or more examples, the input to move the point-of-view location in the virtual reality space to the requested point-of-view location is received from a hand-held controller which comprises part of the apparatus. In one or more examples, the controller may be non-hand-held, such as an input terminal.

In one or more examples, the apparatus is configured to provide for presentation, using the virtual reality apparatus, of the virtual reality space from the requested point-of-view location in the virtual reality space if it is determined that the requested point-of-view location is allowed.

In one or more examples, apparatus forms part of the virtual reality apparatus.

In one or more examples, said means comprises a processor and memory for executing computer program code and, in particular, may comprise one or more of a virtual reality renderer for presenting the virtual reality space using the virtual reality apparatus, a processor for controlling the position based on the sensor input, a receiver for receiving input from a user interface, a processor for determining the allowed/not allowed status, and a processor for determining the compromise locations/orientations.

In a second example aspect, there is provided a method comprising:

providing for presentation, using a virtual reality apparatus, of a virtual reality space from a point-of-view location in the virtual reality space and with a direction-of-view orientation in the virtual reality space, the virtual reality space having at least one defined region and at least one non-defined region;

controlling the position of the point-of-view location and the direction-of-view orientation in the virtual reality space based on signalling from one or more sensors configured to determine a respective and corresponding physical position and physical orientation of a user within a boundary of a real-world play space;

receiving input to move the point-of-view location in the virtual reality space to a requested point-of-view location by means other than said sensed physical position and physical orientation of the user in the real-world play space;

determining if the requested point-of-view location is allowed or not allowed based on information indicative of the current physical location of the user in the real-world play space and the boundary of the real-world play space, wherein a location in the virtual space is not allowed if any physical locations within the boundary of the real-world play space relative to the current physical location of the user correspond to point-of-view locations in the virtual reality space relative to said location in the virtual space that lie within a non-defined region of the virtual reality space, and wherein a location in the virtual space is allowed if all physical locations within the boundary of the real-world play space relative to the current physical location of the user correspond to point-of-view locations in the virtual reality space relative to said location in the virtual space that are wholly within the defined region of the virtual reality space, and if the requested point-of-view location is not allowed, determining at least one of:

(i) a compromise point-of-view location in the virtual reality space comprising a location in the virtual reality space determined based on the requested point-of-view location and that is allowed;
(ii) a compromise direction-of-view orientation in the virtual reality space comprising an orientation determined based on the direction-of-view orientation at the time the input is received and with which the requested point-of-view location is allowed;
(iii) a compromise point-of-view location and a compromise direction-of-view orientation in the virtual reality space comprising a location and orientation determined based on the requested point-of-view location and the direction-of-view orientation at the time the input is received and wherein the compromise point-of-view location in combination with the compromise direction-of-view orientation is allowed;
(iv) a compromise physical position of the user in the real-world play space at which the requested point-of-view location is allowed, wherein the requested point-of-view location is allowed if all physical locations within the boundary of the real-world play space relative to the compromise physical location of the user correspond to point-of-view locations in the virtual reality space that are wholly within the defined region of the virtual reality space;
and providing for presentation, using the virtual reality apparatus, of the virtual reality space respectively from the at least one of (i) compromise point-of-view location in the virtual reality space, (ii) requested point-of-view location with the compromise direction-of-view orientation; (iii) compromise point-of-view location with the compromise direction-of-view orientation and (iv) the requested point-of-view location based on signalling indicative of the user having moved to the compromise physical position.

In one or more examples, the method includes presenting an indicator indicating the difference between the at least one of:
(i) the compromise point-of-view location and the requested point-of-view location; and
(ii) the compromise direction-of-view orientation and the direction-of-view orientation at the time the input is received;
(iii) the compromise point-of-view location and the requested point-of-view location; and the compromise direction-of-view orientation and the direction-of-view orientation at the time the input is received.

In one or more examples, the method comprises, following the determination of the compromise physical position, providing for presentation of guidance in order to guide the user to the compromise physical position.

In a third example aspect, there is provided a computer readable medium comprising computer program code stored thereon, the computer readable medium and computer program code being configured to, when run on at least one processor, perform the method of:
providing for presentation, using a virtual reality apparatus, of a virtual reality space from a point-of-view location in the virtual reality space and with a direction-of-view orientation in the virtual reality space, the virtual reality space having at least one defined region and at least one non-defined region;
controlling the position of the point-of-view location and the direction-of-view orientation in the virtual reality space based on signalling from one or more sensors configured to determine a respective and corresponding physical position and physical orientation of a user within a boundary of a real-world play space;
receiving input to move the point-of-view location in the virtual reality space to a requested point-of-view location by means other than said sensed physical position and physical orientation of the user in the real-world play space;
determining if the requested point-of-view location is allowed or not allowed based on information indicative of the current physical location of the user in the real-world play space and the boundary of the real-world play space, wherein a location in the virtual space is not allowed if any physical locations within the boundary of the real-world play space relative to the current physical location of the user correspond to point-of-view locations in the virtual reality space relative to said location in the virtual space that lie within a non-defined region of the virtual reality space, and wherein a location in the virtual space is allowed if all physical locations within the boundary of the real-world play space relative to the current physical location of the user correspond to point-of-view locations in the virtual reality space relative to said location in the virtual space that are wholly within the defined region of the virtual reality space, and
if the requested point-of-view location is not allowed, determining at least one of:
(i) a compromise point-of-view location in the virtual reality space comprising a location in the virtual reality space determined based on the requested point-of-view location and that is allowed;
(ii) a compromise direction-of-view orientation in the virtual reality space comprising an orientation determined based on the direction-of-view orientation at the time the input is received and with which the requested point-of-view location is allowed;
(iii) a compromise point-of-view location and a compromise direction-of-view orientation in the virtual reality space comprising a location and orientation determined based on the requested point-of-view location and the direction-of-view orientation at the time the input is received and wherein the compromise point-of-view location in combination with the compromise direction-of-view orientation is allowed;
(iv) a compromise physical position of the user in the real-world play space at which the requested point-of-view location is allowed, wherein the requested point-of-view location is allowed if all physical locations within the boundary of the real-world play space relative to the compromise physical location of the user correspond to point-of-view locations in the virtual reality space that are wholly within the defined region of the virtual reality space;
and providing for presentation, using the virtual reality apparatus, of the virtual reality space respectively from the at least one of (i) compromise point-of-view location in the virtual reality space, (ii) requested point-of-view location with the compromise direction-of-view orientation; (iii) compromise point-of-view location with the compromise direction-of-view orientation and (iv) the requested point-of-view location based on signalling indicative of the user having moved to the compromise physical position.

In a further example aspect there is provided an apparatus comprising:
at least one processor; and at least one memory including computer program code,
the at least one memory and the computer program code configured to, with the at least one processor, cause the apparatus to perform at least the following:
provide for presentation, using a virtual reality apparatus, of a virtual reality space from a point-of-view location in the virtual reality space and with a direction-of-view orientation in the virtual reality space, the virtual reality space having at least one defined region and at least one non-defined region;
control the position of the point-of-view location and the direction-of-view orientation in the virtual reality space based on signalling from one or more sensors configured to determine a respective and corresponding physical position and physical orientation of a user within a boundary of a real-world play space;
receive input to move the point-of-view location in the virtual reality space to a requested point-of-view location by means other than said sensed physical position and physical orientation of the user in the real-world play space;
determine if the requested point-of-view location is allowed or not allowed based on information indicative of the current physical location of the user in the real-world play space and the boundary of the real-world play space, wherein a location in the virtual space is not allowed if any physical locations within the boundary of the real-world play space relative to the current physical location of the user correspond to point-of-view locations in the virtual reality space relative to said location in the virtual space that lie within a non-defined region of the virtual reality space, and wherein a location in the virtual space is allowed if all physical locations within the boundary of the real-world play space relative to the current physical location of the user correspond to point-of-view locations in the virtual reality space relative to said location in the virtual space that are wholly within the defined region of the virtual reality space, and
if the requested point-of-view location is not allowed, determine at least one of:
  (i) a compromise point-of-view location in the virtual reality space comprising a location in the virtual reality space determined based on the requested point-of-view location and that is allowed;
  (ii) a compromise direction-of-view orientation in the virtual reality space comprising an orientation determined based on the direction-of-view orientation at the time the input is received and with which the requested point-of-view location is allowed;
  (iii) a compromise point-of-view location and a compromise direction-of-view orientation in the virtual reality space comprising a location and orientation determined based on the requested point-of-view location and the direction-of-view orientation at the time the input is received and wherein the compromise point-of-view location in combination with the compromise direction-of-view orientation is allowed;
  (iv) a compromise physical position of the user in the real-world play space at which the requested point-of-view location is allowed, wherein the requested point-of-view location is allowed if all physical locations within the boundary of the real-world play space relative to the compromise physical location of the user correspond to point-of-view locations in the virtual reality space that are wholly within the defined region of the virtual reality space;
and provide for presentation, using the virtual reality apparatus, of the virtual reality space respectively from the at least one of (i) compromise point-of-view location in the virtual reality space, (ii) requested point-of-view location with the compromise direction-of-view orientation; (iii) compromise point-of-view location with the compromise direction-of-view orientation and (iv) the requested point-of-view location based on signalling indicative of the user having moved to the compromise physical position.

It will be appreciated that the optional features of one aspect may equally apply to the other aspects in terms of the functionality provided. The present disclosure includes one or more corresponding aspects, examples or features in isolation or in various combinations whether or not specifically stated (including claimed) in that combination or in isolation. Corresponding means and corresponding functional units (e.g., function enabler, AR/VR graphic renderer, display device) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which:

FIG. 4 shows a virtual reality space with the real-world play space overlaid thereon and the input of a requested point-of-view location;

FIG. 5 shows the virtual reality space of FIG. 4 with the real-world play space overlaid thereon and the point-of-view location having been placed at the requested point-of-view location of FIG. 4;

FIG. 6 shows the virtual reality space with the real-world play space overlaid thereon with the user at the same location in the virtual reality space but with a different location in the real-world play space;

DESCRIPTION OF EXAMPLE ASPECTS

Figure 1:
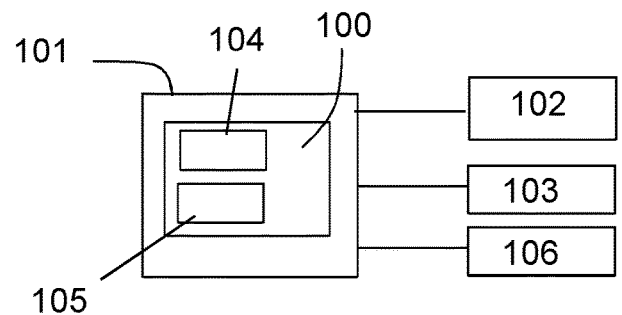
FIG. 1 illustrates an example apparatus for providing for presentation of a virtual reality space.

Virtual reality (VR) may use a VR display comprising a headset, such as glasses or goggles or virtual retinal display, or one or more display screens that surround a user to provide the user with an immersive virtual experience. A virtual reality apparatus, which may or may not include the VR display, may provide for presentation of multimedia VR content representative of a virtual reality space to a user to simulate the user being present within the virtual reality space. Accordingly, in one or more examples, the virtual reality apparatus may provide signalling to a VR display for display of the VR content to a user while in one or more other examples, the virtual reality apparatus may be part of the VR display, e.g. part of the headset. The virtual reality space may be generated from the VR content. The VR content may therefore define the virtual reality space and the arrangement of imagery, objects, audio and any other content in the virtual reality space. Accordingly, the user feels immersed in the space, as if they were there, and may look around the VR space at the elements of the VR content displayed/presented around them. Virtual reality may be used to replicate a real-world scene to simulate the user being physically present at a real-world location or may be used to present a VR space of computer generated content or a combination of computer generated and real world content. Thus, the VR content may be considered to comprise the imagery (e.g. static or video imagery), audio and/or accompanying data from which a virtual reality space may be generated for display. The virtual reality apparatus may therefore generate the virtual, three-dimensional, VR space in which to present the imagery, audio and/or other content of the VR content. One or more examples herein may relate to the provision of virtual reality.

The spatial extent of the VR space is typically larger than a portion a user can view with the VR display at any one time. Thus, the virtual reality apparatus may provide, for display on the VR display, a virtual reality view of the VR space to a user, the VR view showing only a spatial portion of the VR space that is viewable at any one time. The virtual reality apparatus may provide for panning around of the VR view in the VR scene based on movement of a user's head or other user input.

Augmented reality (AR) may be considered to be a subset of virtual reality. AR may use an AR display, such as glasses or goggles or a virtual retinal display, to augment a view of the real world (such as seen through the glasses or goggles) with computer generated content.

An augmented reality apparatus, which may or may not include an AR display, may provide for presentation of multimedia AR content configured to be overlaid over the user's view of the real-world. Thus, a user of augmented reality may be able to view the real-world environment around them, which is augmented or supplemented with content provided by the augmented reality apparatus, which may be overlaid on their view of the real world and/or aurally overlaid over an aural real world scene they can hear. The content may comprise multimedia content such as pictures, photographs, video, diagrams, textual information, aural content among others. Thus, while augmented reality may provide for direct viewing of the real world with the addition of computer generated graphics and/or audio content, a user of virtual reality may only be able to see content presented on the VR display of the virtual reality apparatus substantially without direct viewing of the real world. One or more examples herein may relate to the provision of augmented reality.

The VR content in combination with the virtual reality apparatus may be configured to enable a user to be free to explore the virtual reality space. Thus, the virtual reality apparatus may allow for the user to be provided with a free point of view or point-of-view location in the virtual reality space along with a free direction-of-view. Such VR is also known as six degrees of freedom (6DoF) VR or volumetric VR to those skilled in the art. Thus, in 6DoF VR the user may be free to look in different directions around the VR space by modification of their viewing direction or direction-of-view and also free to change their viewing location or point-of-view location in the VR space by translation along any one or more orthogonal x, y and z axes.

Mixed reality is similar to augmented and virtual reality and includes the use of a three-dimensional model of the real-world environment to enable virtual objects, including visual and audio objects, to appear to interact with real-world objects in terms of one or more of their movement, presentation (e.g. audible presentation) and appearance. Mixed reality may be considered as a subset of virtual reality and a subset of augmented reality.

The consumption of virtual reality content may require the use of a real-world play space in which the user can move. The position or movement of the user in the real-world play space may be used as input to control the user's point-of-view location in a virtual space. Accordingly, one or more sensors, such as location sensors, orientation sensors, accelerometers, cameras or any other type of sensor may be used to track or monitor the position, movement and/or orientation of the user in the real-world play space. The position of the user in the real-world play space can be mapped to a point-of-view location in the virtual reality space. Likewise, movement of the user in the real-world play space provides for corresponding movement of the point-of-view location in the virtual reality space. Further, the orientation of the user (e.g. head orientation) can be mapped to a direction-of-view in the virtual reality space. Likewise, changes in the (e.g. head or body) orientation of the user provides for corresponding movement of a direction-of-view in the virtual reality space. The virtual reality apparatus may therefore provide for display of the view of the virtual reality space with a point-of-view location and a direction-of-view that corresponds to a particular mapping from the physical location/orientation of the user in the real-world play space.

In one or more examples, the virtual reality space may be large while the real-world play space (e.g. a user's living room) may be relatively small. For example, a virtual reality space comprising a virtual city would be difficult to fully explore using user-movement as input if the real-world play space was only the size of a room. Thus, the mapping between the location in the real-world play space to the point-of-view location in the virtual space may not enable a user to reach all parts of the virtual reality space but only a limited portion of the virtual space. A similar problem may arise due to the shape of the real-world play space not corresponding exactly to the shape of the virtual reality space and therefore parts of the virtual reality space may not be reachable.

To address this issue, it may be possible to move or "teleport" to a different, requested point-of-view location. The term "teleport" is used herein as a convenient way to describe the movement of the virtual point-of-view location in the virtual space or a new virtual point-of-view location without the user having to physically move to a corresponding position in the real-world play space to effect said movement. Accordingly, it is akin to science fiction teleportation but in the virtual reality space 200. It will be appreciated that input means other than the sensed user position/orientation in the real-world play space may be used to cause the teleportation to the requested point-of-view location. The movement to the requested point-of-view location may therefore change the mapping between the user's physical location in the real-world play space and the point-of-view location in the virtual space. To avoid disorientating the user it may be typical for the mapping between the user's physical orientation and their direction-of-view in the virtual space to be unchanged when teleporting.

Figure 2:
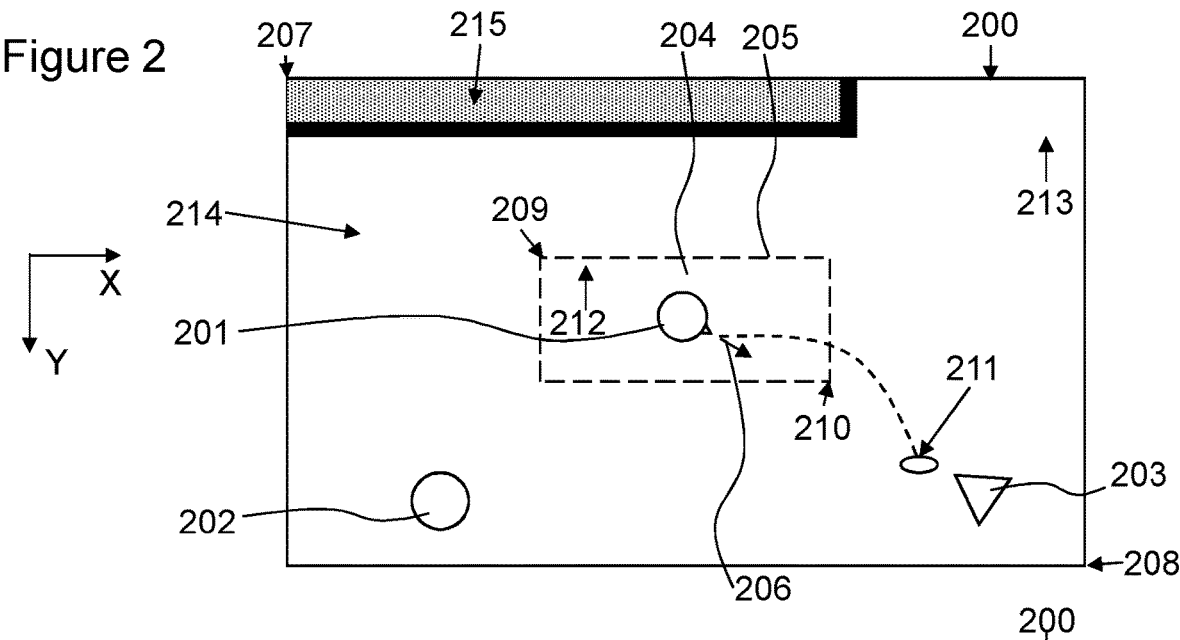
FIG. 2 shows a virtual reality space with a real-world play space overlaid thereon to illustrate how movement of the user in the real-world play space corresponds to movement in the virtual space and the input of a requested point-of-view location.
Figure 3:
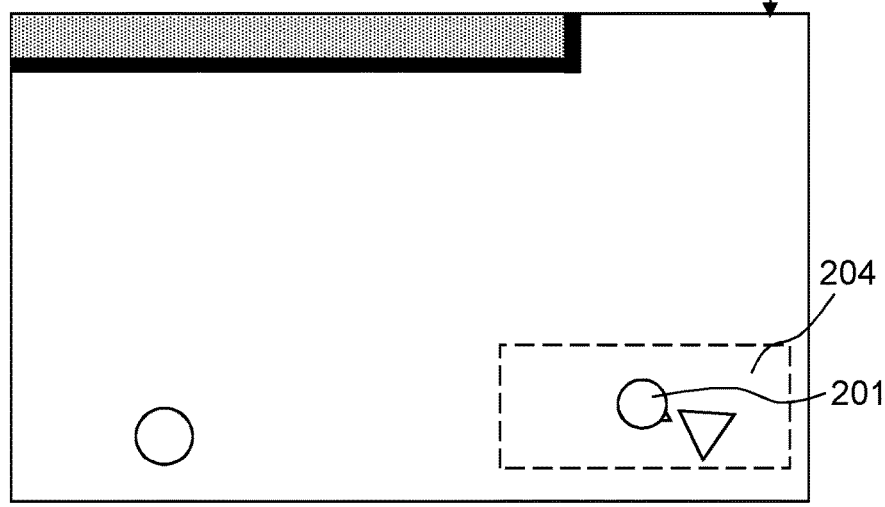
FIG. 3 shows the virtual reality space of FIG. 2 with the real-world play space overlaid thereon and the point-of-view location having been placed at the requested point-of-view location of FIG. 2.
Figure 7:
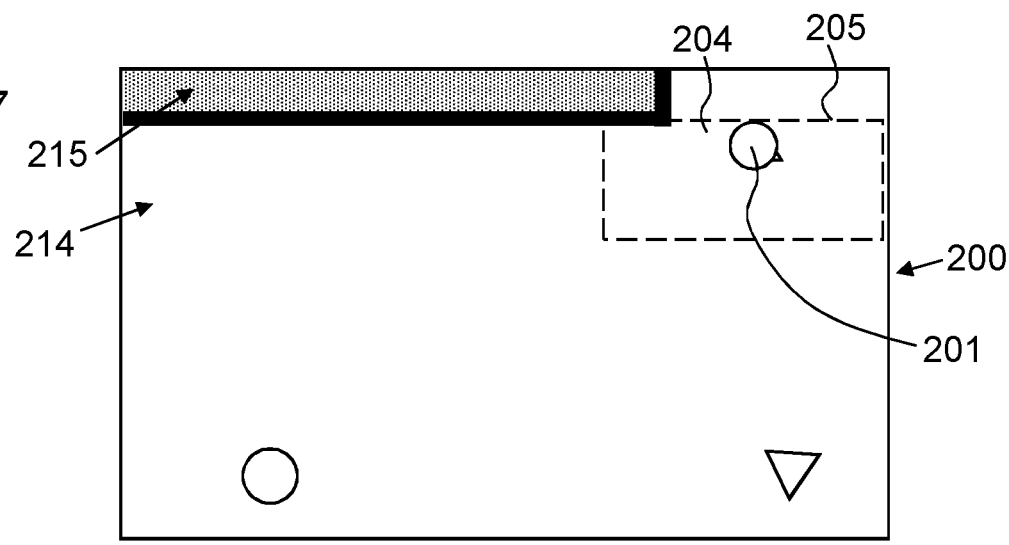
FIG. 7 shows the virtual reality space of FIG. 6 with the real-world play space overlaid thereon and the point-of-view location having been placed at the requested point-of-view location of FIG. 6.

Example FIGS. 2 and 3 illustrate teleporting. FIG. 2 shows a virtual reality space 200 in which a user 201, shown at a point-of-view location, may virtually explore. The virtual reality space 200 may include a variety of imagery, audio and virtual objects 202, 203 to create a virtual world. FIG. 2 also shows the real-world play space 204 overlaid onto the virtual reality space 200. The real-world play space has a boundary 205, which may be defined by the walls or other physical barrier of the user's room or the region over which the user's position/orientation is tracked by one or more sensors. The position of the user 201, as shown in the Figures, therefore also represents the real-world position of the user in the real-world play space 204. The user 201 also has an orientation 206 in the real-world play space 204, illustrated by the direction of the user's nose in the plan view of FIG. 2 but also shown by an arrow for ease of reference in this Figure. The orientation 206 in the real-world, as with the position, maps to a corresponding direction-of-view orientation in the virtual reality space 200.

The real-world play space 204 is smaller in spatial extent than the virtual reality space 200. Accordingly, the spatial extent of the point-of-view locations reachable by user movement in the real-world play space 204 within its boundary 205 is less than the spatial extent of the virtual reality space 200. It may be appreciated that the spatial size of the virtual reality space is arbitrary because a virtual reality space can be any desired size and the scale of the user in the virtual reality space will also affect how large it is perceived to be. Thus, put another way, the size of the real-world play space, based on a given mapping between a magnitude of a movement in the real-world play space to a magnitude of a movement in the virtual reality space, is smaller than the virtual reality space.

In one or more examples, there may be a mapping between positions and orientation in the real-world play space 204 and corresponding point-of-view locations and direction-of-view orientations in the virtual reality space 200. Thus, as an example, the virtual reality space 200 may have a coordinate system to specify point-of-view locations and a predetermined reference direction from which to specify direction-of-view orientations. Thus, a coordinate [x,y] may specify the distance from an origin point along two orthogonal directions. It will be appreciated that the virtual reality space may use a three-dimensional coordinate system (e.g. x, y, z) but for simplicity we refer to only the x and y coordinates here. As an example, point 207 in the virtual reality space 200 may be assigned as point-of-view location [0,0] and point 208 may be assigned as point-of-view location [280, 170]. The real-world play space 204 may also be assigned a coordinate system so that the one or more sensors configured to track the location of the user 201 may conveniently report the location. Thus, as an example, point 209 in the real-world play space 204 may be assigned as position [0,0] and point 210 may be assigned as position [100, 40].

To map or "translate" a coordinate in the real-world play space 204 to a location in the virtual reality space 200, the apparatus may use a mapping function. In this example, the mapping function for example FIG. 2 is to "add" [+80, +60] to the real-world play space coordinate. Thus, position [0,0] in the real-world play space 204 may map to [0+80,0+60] =[80, 60] in the virtual reality space 200. Likewise, position [100, 40] in the real-world play space 204 may map to [100+80,40+60]=[180, 100] in the virtual reality space 200. Thus, by movement in the real-world play space 204 shown in FIG. 2, the user 201 may reach point-of-view locations between [80, 60] and [180, 100] in the virtual reality space. Accordingly, a requested point-of-view location 211 with a coordinate [220,130], so that the user may examine the virtual object 203, cannot be reached by movement in the real-world play space because it is beyond [180, 100] and teleportation is required.

FIG. 3 shows the teleportation having occurred which changes the point-of-view location of the user 201 to the requested point-of-view location 211. As mentioned above, teleportation does not require the physical movement of the user in the real-world play space 204 and therefore the user 201 is shown in the same position in the real-world play space 204 in FIG. 3 as in FIG. 2. The input of the requested point-of-view location 211 may be provided by a controller (not shown), such as a hand-held controller, used by the user 201. Teleportation causes the modification of the mapping function between positions in the real-world play space 204 and point-of-view locations in the virtual reality space 200. Thus, the new mapping may be determined by calculating the function required to translate the user's current position in the real-world play space in the real-world play space coordinate system to the requested point-of-view location 211 in the virtual reality space coordinate system. In this example, the mapping may change from [+80, +60] to [+170, +120]. Accordingly, the position [0,0] in the real-world play space 204 may map to [0+170,0+120]=[170, 120] in the virtual reality space. Likewise, position [100, 40] in the real-world play space 204 may map to [100+170,40+120]=[270, 160] in the virtual reality space 200.

Thus, to determine the new mapping, the function to translate the current position of the user in the real-world play space e.g. [50, 20] to the requested point-of-view location e.g. [220, 140] may be determined=[220-50, 140-20]=[+170, +120]. The apparatus may then be able to determine the regions reachable from the requested point-of-view location based on movement in the real-world play space, which comprises [220-50, 140-20] to [220+50, 140+20].

In terms of mapping a user orientation in the real-world play space 204 to an orientation in the virtual reality space 200, there is no change—the orientation 212 of the real-world play space 204 is mapped to the orientation 213 of the virtual reality space.

Teleportation may provide a convenient way to explore large virtual reality spaces 200 in combination with user input to change the point-of-view location by way of physical user movement in the real-world play space 204.

In one or more examples, the virtual reality space 200 may have a boundary or limits on its spatial extent. Thus, there may be regions within the boundary of the virtual reality space 200 that are explorable and regions outside the boundary that are not explorable. Further, the virtual reality space 200 may have regions that are not explorable within and spaced from the boundary of the virtual reality space. The definition of what regions are explorable and non-explorable may be defined by the creator of the virtual reality space or based on progress within a virtual reality game.

Example FIGS. 2-18 show the virtual reality space 200 having at least one defined region 214 within which the point-of-view location is placeable. Thus, the defined region is the term given to the part of the virtual space that may be user explorable and from which a view of the virtual space may be generated. Example FIGS. 2-18 also show the virtual reality space 200 having at least one non-defined region 215 within which the point-of-view location is non-placeable. Thus, the non-defined region is the term given to the part of the virtual reality space 200 that is not user explorable and from which a view of the virtual space may not be generated. The non-defined region 215, in this and one or more example, may extend between virtual reality space coordinates [0,0] and [220, 20].

In one or more examples, the virtual reality content, comprising the data from which the virtual reality space is generated, may specify the defined and non-defined regions. In other examples, the virtual reality apparatus 101 that generates the virtual reality space 200 or a rules followed by a game executed on the virtual reality apparatus may specify the defined and non-defined regions 214, 215.

The presence of non-defined regions 215 may cause problems when teleporting to a requested point-of-view location adjacent to the non-defined regions 215.

Example FIG. 4 shows an arrangement of virtual reality space 200 and play space 204 similar to FIG. 2. However, in this example, the requested point-of-view location 411, comprising the location in the virtual reality space 200 that the user wishes to teleport to is at a location that is adjacent the non-defined region 215.

Example FIG. 5 shows a non-desired example in which the point-of-view location of the user 201 has been teleported to the requested point-of-view location 411. The teleporting to the requested point-of-view location 411 is not desirable because there are physical locations, i.e. in region 515 relative to the real-world play space 204, within the boundary 205 of the real-world play space relative to the current physical location of the user 201 that correspond to point-of-view locations, i.e. in region 515 relative to the virtual reality space 200, in the virtual reality space 200 that lie within the non-defined region 215 of the virtual reality space. Thus, coordinate [0,0] in the real-world play space 204 may map to [200, 0] in the virtual reality space 200 wherein [200,0] lies within the non-defined region of [0,0] to [220, 20]. Accordingly, the extent of the real-world play space 204 when mapped to virtual reality space coordinates may be compared to the coordinates of the non-defined regions 215 to check for an overlap. However, while comparing coordinates mapped into a common space (e.g. the virtual reality space) may be one way to identify problems with a possible change in the mapping of the real-world play space 204 to the new requested point-of-view location 411, it will be appreciated that many other algorithms may be possible and geometrical comparisons made to obtain a similar determination.

Accordingly, if the positioning of the point-of-view location at 411 were allowed, and if the user 201 were subsequently to move to a position in the real-world play space 204 that lies within region 515, e.g. play space coordinate [0,0], then it would not be possible to present a view of the virtual reality space 200 for the user 201 because views from point-of-view locations in the non-defined regions 215 are not possible. This could be confusing for the user because their position in the real-world play space 204 could not be mapped to a point-of-view location in the virtual space. Accordingly, it may appear that their user input has ceased to have any effect.

Example FIG. 6 is substantially similar to FIG. 4 and shows the user 201 having made the same request to move or teleport to the same requested point-of-view location 411. However, in this example, the position of the user 201 in the real-world play space 204 is different. In particular, the user is located against an "upper" part of the boundary 205 of the real-world play space 204 and may have a play space coordinate [55, 0]. Thus, teleporting to the same requested point-of-view location 411 at virtual space coordinate [235, 20] means that that the real-world play space will map to an area of [180, 20] to [280,60]. This requested point-of-view location is allowed because all physical locations within the boundary 205 of the real-world play space 204 relative to the current physical location of the user (at [55,0]) correspond to point-of-view locations in the virtual reality space (e.g. between [180, 20] to [280,60]) that are wholly within the defined region 214 of the virtual reality space 200 (e.g. not with non-defined region 215 that extends from [0,0] to [220, 20]).

As illustrated by the discussion of FIGS. 4-7, the teleporting to the requested point-of-view location 411 may be forbidden in some circumstances and allowed in others (e.g. based on where the user may be standing in the real-world play space 204). This may be confusing.

Figure 8:
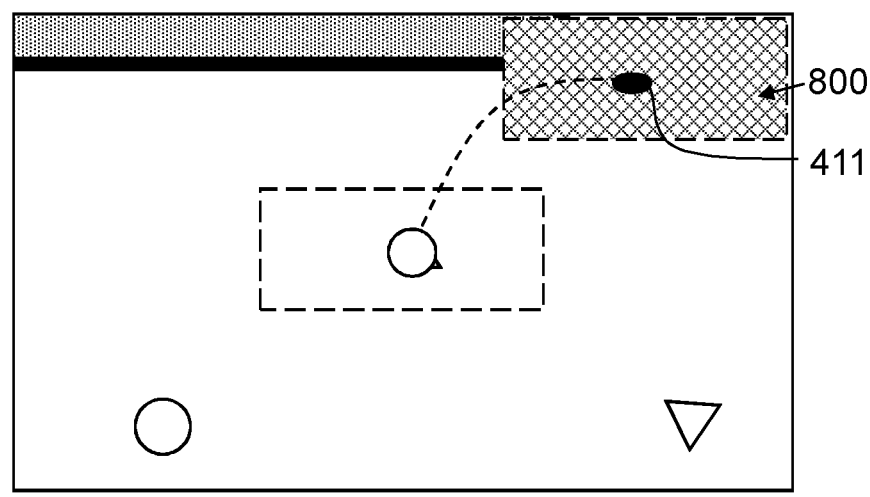
FIG. 8 shows a virtual reality space with a play space overlaid thereon with a first pattern applied to an area around the requested point-of-view location.

In a non-desired example, the user may be provided with feedback to show that their request to move to the requested point-of-view location 411 is allowed or not allowed. Example FIG. 8 shows a first pattern or colour 800 around the requested point-of-view location 411 that indicates movement to this point-of-view location is forbidden.

Figure 9:
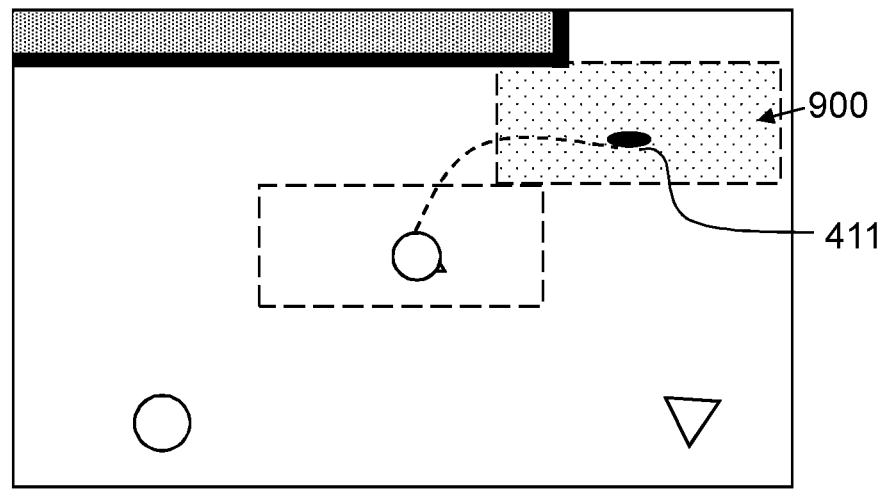
FIG. 9 shows a virtual reality space with a play space overlaid thereon with a second pattern applied to an area around the requested point-of-view location.

Example FIG. 9 shows a second, different pattern or colour 900 around the requested point-of-view location 411 that indicates movement to this point-of-view location is allowed.

Despite limited feedback being given, this may be confusing at it may not be apparent why the move to the requested point-of-view location 411 is not fulfilled. It may be difficult to efficiently explain the non-fulfilment to the user without interrupting their interaction with the virtual reality space 200. The user may be required to enter a further requested point-of-view location, which may be frustrating.

We now describe an apparatus configured to provide an effective way of teleporting to requested point-of-view locations.

Example FIG. 1 shows an example apparatus 100 for effecting the movement or teleporting to a requested point-of-view location in a virtual reality space 200. The apparatus 100 may be part of a virtual reality apparatus 101 configured to present the virtual reality space. The virtual reality apparatus 101 may provide for display, or more generally presentation, of the virtual reality space using a virtual reality display, such as headset 102. The headset 102 may include a display for display of imagery and headphones for audio presentation. The apparatus 100 may receive signalling from one or more sensors 103 that are configured to detect the position and orientation of the user (not shown in FIG. 1) within the real-world play space 204. One or more of the one or more sensors may be part of the headset 102. The one or more sensors may comprise a combination of a camera focussed on the real-world play space 204 and one or more headset-based sensors. The signalling from the one or more sensors may be indicative of the position of the user 201 in the real-world play space 204 and the orientation of the user 201 in the real-world play space 204.

The apparatus 100 may comprise or be connected to a processor 104 and a memory 105 and may be configured to execute computer program code to perform its function. The apparatus 100 may have only one processor 104 and one memory 105 but it will be appreciated that other embodiments may utilise more than one processor and/or more than one memory (e.g. same or different processor/memory types). Further, the apparatus 100 may be an Application Specific Integrated Circuit (ASIC).

The processor may be a general purpose processor dedicated to executing/processing information received from other components, such as from the sensors 103, in accordance with instructions stored in the form of computer program code in the memory. The output signalling generated by such operations of the processor is provided onwards to further components, such as to the virtual reality apparatus 101 or headset 102.

The memory 105 (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example, the respective processors and memories are electrically connected to one another internally to allow for electrical communication between the respective components. In this example, the components are all located proximate to one another so as to be formed together as an ASIC, in other words, so as to be integrated together as a single chip/circuit that can be installed into an electronic device. In some examples one or more or all of the components may be located separately from one another.

The apparatus 100, in this example, forms part of the virtual reality apparatus 101. In this example, the processor 104 and memory 105 is shared with the virtual reality apparatus 101, but in other examples, they may have their own processors and/or memory. In other examples, the apparatus 100 may be separate from the virtual reality apparatus but may provide for at least partial control of the virtual reality apparatus 101.

The virtual reality apparatus 101 or the virtual reality apparatus 101 under the control of the apparatus 100 may provide for display of a virtual reality space based on virtual reality content comprising data that represents at least visual imagery for display in the virtual space that is for viewing by a user using the headset 102. The apparatus may be configured to receive virtual reality content in order to provide the virtual reality space or it may receive information about the receipt of the content by the virtual reality apparatus 101 and provide for control of the virtual reality apparatus.

To summarise the functionality of the apparatus 100 thus far, the apparatus 100 comprises means, such as processor 104 and memory 105, configured to provide for presentation, using a virtual reality apparatus 101, of a virtual reality space 200 from a point-of-view location (e.g. the current virtual location of the user) in the virtual reality space and with a direction-of-view orientation in the virtual reality space. The virtual reality space 200 has at least one defined region 214 within which the point-of-view location is placeable and at least one non-defined region 215 within which the point-of-view location is non-placeable. Thus, the defined and non-defined regions 214, 215 may be regions designated as such in the virtual reality space, such as in the VR content.

The apparatus 100 comprises means configured to control the position of the point-of-view location and the orientation of the direction-of-view orientation in the virtual reality space 200 based on signalling from the one or more sensors 103 configured to determine a respective and corresponding physical position and physical orientation of the user 201 in the real-world play space 204. The real-world play space 204 comprises a real-world space in which user input can be provided to the apparatus 100. The real-world space is finite and thus has at least a boundary, such as a periphery that defines its shape and/or size. The boundary 205 may be defined by a physical barrier in the real-world play space, such as the walls of a room or the position of furniture in the room. The boundary 205 may be defined by a spatial extent over which the one or more sensors 103 are configured to sense the physical position and physical orientation of the user 201.

The apparatus 100 includes means configured to receive input from a controller 106. The apparatus 100 is configured to use the controller input to move the point-of-view location in the virtual reality space 200 to a new, requested point-of-view location 211, 411. It will be appreciated that the means to receive this "teleport" input using the controller 106 is by a means other than said sensed physical position and physical orientation of the user 201 in the real-world play space 204 provided by the sensors 103. The controller 106 may allow for selection of a requested point-of-view location in the user's view of the virtual reality space from their current point-of-view location. The controller 106 may allow for selection of a requested point-of-view location on a map of the virtual reality space that may be presented to the user.

As explained above, the request to move to a requested point-of-view location 411 adjacent a non-defined region 215 can cause problems. Thus, the apparatus 100 may be configured to determine if the move to a requested point-of-view location 411 is allowed or not allowed.

The determination of if the move to a requested point-of-view location 411 is allowed or not allowed is based on information indicative of the current physical location of the user 201, at the time of making the request to move to the requested point-of-view location 411, in the real-world play space 204 and the boundary 205 of the real-world play space. Thus, the apparatus 100 may receive information from the sensors 103 indicative of the current location of the user 201 in the real-world play space 204. The apparatus 100 may already have information indicative of the boundary 205 of the real-world play space 204 because it may provide for the mapping between the positions/orientations in the real-world play space 204 to point-of-view locations/direction-of-view orientations in the virtual reality space 200. However, in other examples, the sensors 103 or predetermined information defining the real-world play space 204 may provide the apparatus 100 with such information.

As discussed above, a location in the virtual space is not allowed if any physical locations within the boundary 205 of the real-world play space 204 relative to the current physical location of the user 201 (e.g. at the time of the "teleport" input) correspond to point-of-view locations in the virtual reality space relative to said location that lie within a non-defined region 215 of the virtual reality space 200. In one or more examples, the apparatus 100 may be configured to determine the requested point-of-view location as not allowed if some but not all of the physical locations within the boundary 205 of the real-world play space 204 relative to the current physical location of the user 201 correspond to point-of-view locations in the virtual reality space 200 relative to said requested point-of-view location that lie within a non-defined region 215 of the virtual reality space 200. Thus, the apparatus 100 may be configured to make said determinations when the requested point-of-view location is within a defined region of the virtual reality space 200. A different apparatus may be configured to act if the requested point-of-view location is in a non-defined region.

The apparatus 100 may be configured to determine that a requested point-of-view location is allowed if all physical locations within the boundary 205 of the real-world play space 204 relative to the current physical location of the user 201 (e.g. at the time of the "teleport" input) correspond to point-of-view locations in the virtual reality space 200 relative to said requested point-of-view that are wholly within the defined region 214 of the virtual reality space 200.

This determination may be determined using the calculations corresponding to the coordinate mapping described above or any other method, such as determination of when areas overlap, such as at region 515.

Figure 10:
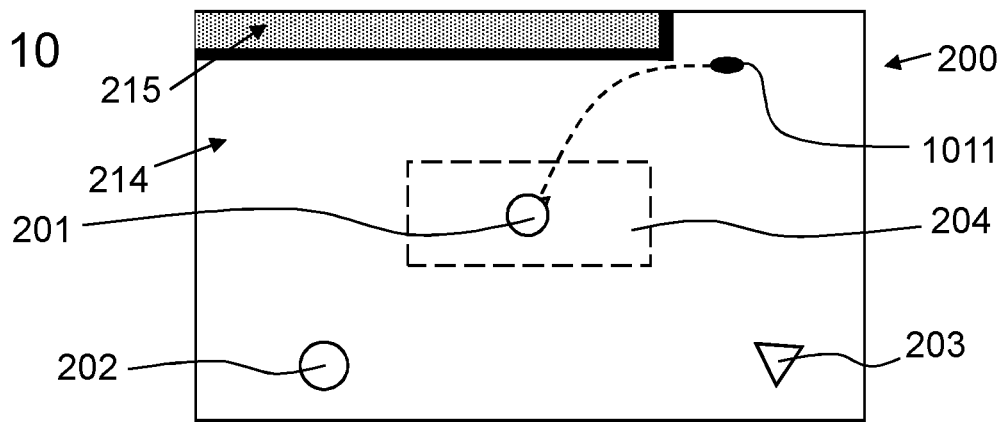
FIG. 10 illustrates a first example embodiment comprising a virtual reality space with the real-world play space overlaid thereon and the input of a requested point-of-view location.
Figure 11:
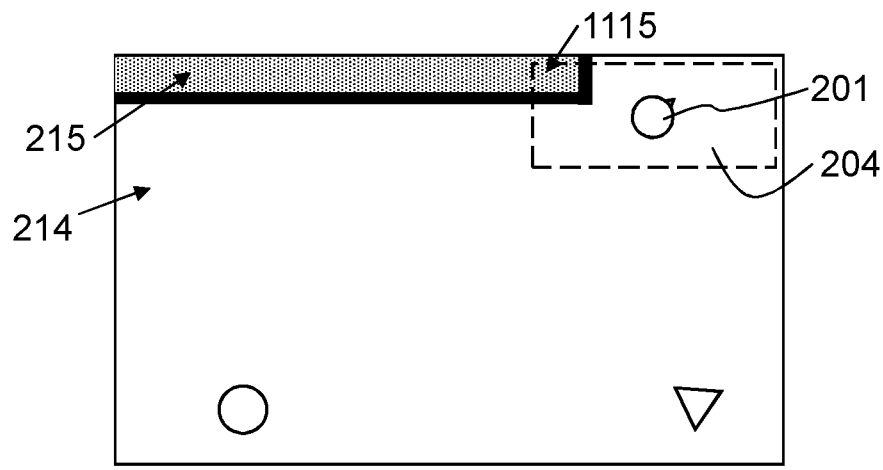
FIG. 11 illustrates that the requested point-of-view location of FIG. 10 is not allowed.
Figure 12:
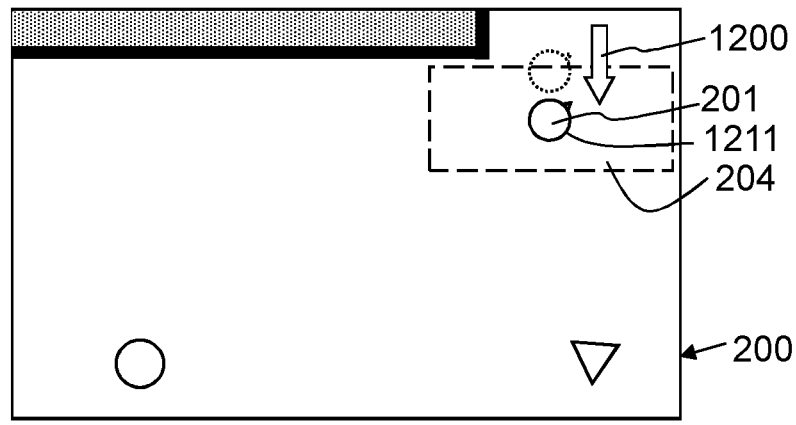
FIG. 12 illustrates the point-of-view location having been placed at a compromise point-of-view location.

Example FIGS. 10 to 12 illustrate a first example embodiment of the functionality of the apparatus 100.

The user 201 is at a first point-of-view location and the apparatus 100 and virtual reality apparatus 101 are therefore providing for display of the virtual reality space as it would appear at the point-of-view location substantially in the centre of the virtual reality space 200 as shown in FIG. 10. The user 201 has used the controller 106 to provide input to indicate a requested point-of-view location 1011 to which they want to teleport. Thus, the apparatus 100 receives the requested point-of-view location 1011, comprising the location in the virtual reality space 200 to which the user wishes to teleport, adjacent the non-defined region 215. It will be appreciated that the requested point-of-view location 1011 is substantially the same location as the requested point-of-view location 411 shown in FIGS. 4 and 5 and which was described as being determined as a "not allowed" requested point-of-view location. In particular, the apparatus 100 may be configured to determine that region 1115 of the real-world play space 204 would have a corresponding location in the virtual reality space 200 that lies in a non-defined region 215, namely region 1115 (which, as explained above, represents a part of the real-world play space 204 and a part of the virtual reality space 200 based on the mapping function).

However, in this and one or more examples, provided that the requested point-of-view location 1011 is itself in the defined region 214, the apparatus 100 is configured to provide for placement of the point-of-view location at the requested point-of-view location 1011 as shown in FIG. 11. Further, the apparatus 100 may be configured to provide for presentation, using the virtual reality apparatus 101, of a view of the virtual reality space 200 from the not allowed, requested point-of-view location 1011 in the virtual reality space. While FIG. 11 is shown as a plan view of the virtual reality space 200, it will be appreciated that the view of the virtual reality space presented by the apparatus 100 may be a view as if the user 201 were located at the requested point-of-view location 1011 looking in a direction-of-view orientation that corresponds to their orientation in the real-world play space 204.

However, the apparatus 100 may be configured to then, such as within a short, predetermined time period, provide for a second movement of the point-of-view location from the requested point-of-view location 1011 to a compromise point-of-view location. The second movement to the compromise point of view location may be provided prior to providing control of the position of the point-of-view location and the orientation of the direction-of-view orientation based on the signalling from the one or more sensors. Thus, control of the point-of-view location by user movement may be disabled (or restricted to movement over a smaller area) until after the second movement to the compromise point of view location.

The apparatus 100 may be configured to determine the compromise point of view location as follows. The compromise point-of-view location in the virtual reality space may comprise a location determined based at least on two criteria:
  (a) the compromise point-of-view location is based on the requested point-of-view location 1011; and
  (b) the compromise point-of-view location is an allowed location, that is all physical locations within the boundary of the real-world play space 204 relative to the current physical location of the user 201 correspond to point-of-view locations in the virtual reality space relative to the compromise point-of-view location that are wholly within the defined region of the virtual reality space.

Criteria (a) may be used to ensure that the compromise point-of-view location is near to the requested point-of-view location 1011. Accordingly, the compromise point-of-view location being based on the requested point-of-view location 1011 may comprise being the closest allowed location to the requested point-of-view location 1011. Alternatively, the compromise point-of-view location being based on the requested point-of-view location 1011 may comprise being within a threshold distance of the closest allowed location relative to the requested point-of-view location 1011. In other examples, such as when identifying an allowed location in the vicinity of the requested point-of-view location 1011, the strategy for searching for an allowed location may include moving the point-of-view location in each of a plurality of (e.g. orthogonal) directions until an allowed location is found. The distance to the allowed location along each of the directions may be compared and the allowed location corresponding to the shortest distance is selected. In the example of FIGS. 11 and 12, if we assume that "north" is upward on the page, the search strategy may comprise determining if an allowed location is present by moving the point-of-view location north (in this case, no), east (in this case, no), west (in this case, no) and south (yes). Thus, apparatus 100 may be configured to search for an allowed point-of-view location by extending the search outwardly from the requested point-of-view location 1011 until an allowed location is found. Accordingly, the compromise point-of-view location is based on the requested point-of-view location 1011. It will be appreciated that many different search algorithms may be used to identify the relative position of the compromise point-of-view location from the requested point-of-view location 1011.

However, in summary and as in any of the examples herein, the compromise point-of-view location may be any one of (i) a location closest to the requested point-of-view location that is allowed; (ii) a location closest to the requested point-of-view location along one or more predetermined directions of travel from the requested point-of-view location (e.g. notional north, south, east, west or other orthogonal directions) that is allowed; (iii) a location within a threshold distance of the requested point-of-view location or of the location of option (i).

Example FIG. 12 shows the compromise point-of-view location 1211 (shown also by the location of the user 201 in the virtual reality space 200 of FIG. 12). Accordingly, the apparatus 100 is configured to move 1200 the point-of-view location from the requested point-of-view location 1011 to the compromise point-of-view location 1211.

Further, the apparatus 100 is configured to provide for presentation, using the virtual reality apparatus 101, of a view of the virtual reality space 200 from the compromise point-of-view location 1211 in the virtual reality space. While FIG. 12 is shown as a plan view of the virtual reality space 200, it will be appreciated that the view of the virtual reality space presented by the apparatus 100 may be a view as if the user 201 were located at the compromise point-of-view location 1211 looking in a direction-of-view orientation that corresponds to their orientation in the real-world play space 204.

Thus, the apparatus 100 may provide an interface with an effective experience when changing point-of-view locations because the user input is acted upon to move to the compromise point-of-view location rather than fail to provide for any teleporting movement. Movement to the compromise point-of-view location may enable continued exploration around the virtual space without interruptions caused by the user not understanding or it being inadequately explained to a user why movement to their requested point-of-view location 1011 was not allowed. In addition, the movement to the requested point-of-view location 1011 prior to movement to the compromise point-of-view location 1211 may provide convenient feedback to a user to allow them to understand that determination of a compromise point-of-view location 1211 has occurred but also the relative difference in location between the requested point-of-view location 1011 and the compromise point-of-view location 1211.

In one or more examples, the movement of the point-of-view location from the requested point-of-view location 1011 to the compromise point-of-view location 1211 may be progressively presented to the user by the apparatus 100 as a presentation of the view of the virtual reality space 200 from one or more intermediate point-of-view locations in the virtual space between the requested point-of-view location 1011 and the compromise point-of-view location 1211. Thus, it would appear to the user 201 that they are translated (or, more generally, incrementally moved) to the compromise point-of-view location 1211 from the requested point-of-view location 1011.

In one or more other examples, the apparatus 100 may be configured to move the point-of-view location to the compromise point-of-view location 1211 without first moving to the requested point-of-view location 1011.

In one or more other examples, the apparatus may be configured to provide different feedback for presentation to the user 201. For example, a plan view of a map, similar in appearance to FIG. 12, may be shown to the user to illustrate that the compromise point-of-view location 1211 at which they will be placed is in the direction of arrow 1200 from their requested point-of-view location 1011.

In one or more other examples, the apparatus may be configured to provide for presentation of an indicator such as a voice announcement or graphic to explain that the point of view location has been moved "south" (or any other direction it has been moved) of the requested point-of-view location 1011.

Figure 13:
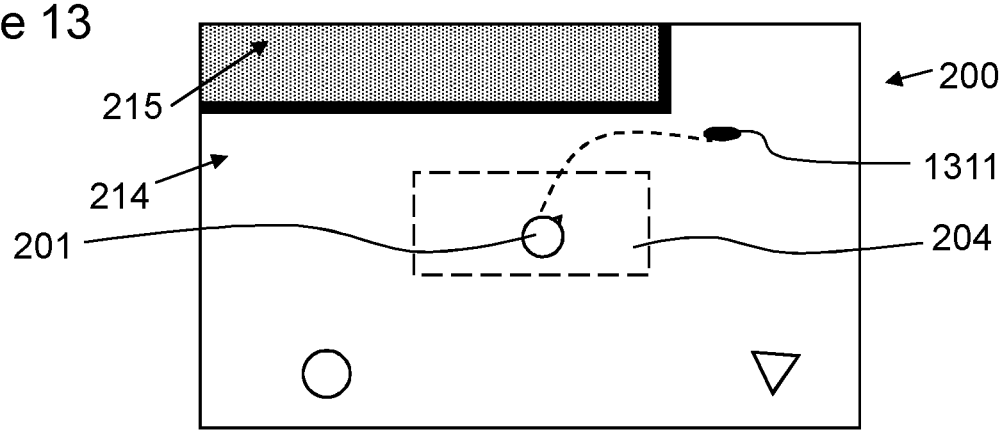
FIG. 13 illustrates a second example embodiment comprising a virtual reality space with the real-world play space overlaid thereon and the input of a requested point-of-view location.
Figure 14:
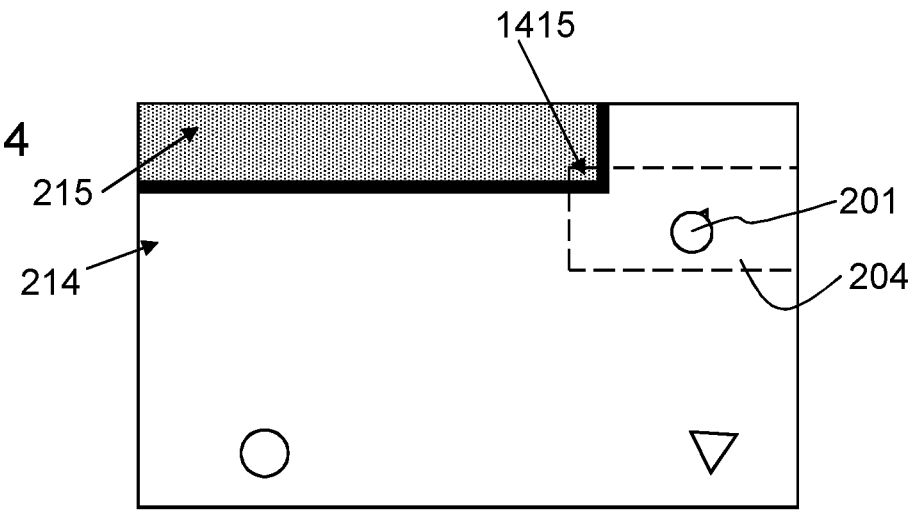
FIG. 14 illustrates that the requested point-of-view location of FIG. 10 is not allowed.
Figure 15:
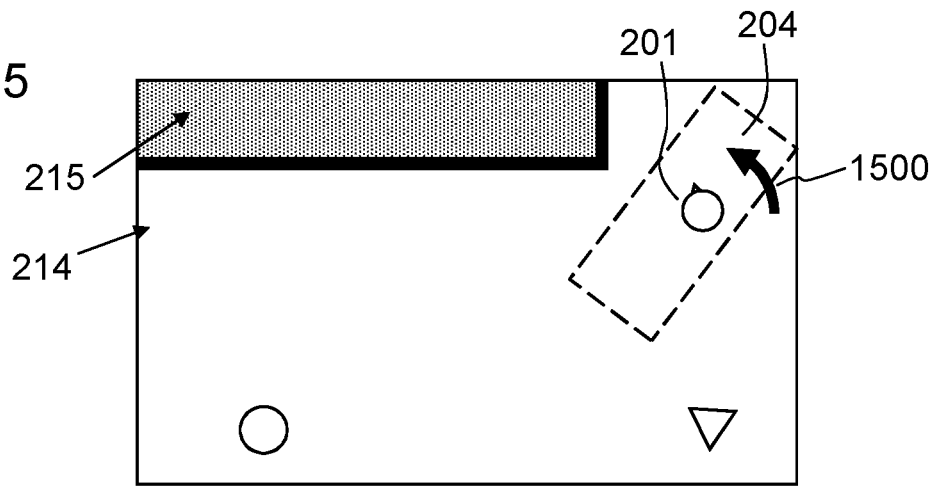
FIG. 15 illustrates the point-of-view location having been placed at a requested point-of-view location but with the direction-of-view orientation having been rotated to a compromise direction-of-view orientation.

Example FIGS. 13 to 15 illustrate a second example embodiment of the functionality of the apparatus 100. In this example, the non-defined region 215 is slightly larger than in previous Figures.

The user 201 is at a first point-of-view location with a first direction-of-view orientation and the apparatus 100 and virtual reality apparatus 101 are therefore providing for display of the virtual reality space as it would appear at the point-of-view location substantially in the centre of the virtual reality space 200 as shown in FIG. 13. The user 201 has used the controller 106 to provide input to indicate a requested point-of-view location 1311 to which they want to teleport. Thus, the apparatus 100 receives the requested point-of-view location 1311, comprising the location in the virtual reality space 200 to which the user wishes to teleport, adjacent the non-defined region 215. With reference to FIG. 14, the apparatus 100 may be configured to determined that region 1415 of the real-world play space 204 would have a corresponding location in the virtual reality space 200 that lies in a non-defined region 215, namely region 1415 (which, as explained above, represents a part of the real-world play space 204 and a part of the virtual reality space 200 based on the mapping function). FIG. 14 shows the placement of the point-of-view location at the not allowed requested point-of-view location 1311.

In this and one or more examples, provided that the requested point-of-view location 1311 is itself in the defined region 214, the apparatus 100 is configured to provide for placement of the point-of-view location at the requested point-of-view location 1311 as shown in FIG. 14. Further, the apparatus 100 may be configured to provide for presentation, using the virtual reality apparatus 101, of a view of the virtual reality space 200 from the not allowed, requested point-of-view location 1311 in the virtual reality space. While FIG. 14 is shown as a plan view of the virtual reality space 200, it will be appreciated that the view of the virtual reality space presented by the apparatus 100 may be a view as if the user 201 were located at the requested point-of-view location 1311 looking in a direction-of-view orientation that corresponds to their orientation in the real-world play space 204.

However, the apparatus 100 may be configured to then, such as within a short, predetermined time period, provide for a second action comprising rotation of the direction-of-view orientation of the user 201 to a compromise direction-of-view orientation in the virtual reality space 200 comprising an orientation determined based on the direction-of-view orientation at the time the input is received and with which the requested point-of-view location is allowed. This second action to rotate the direction-of-view to the compromise direction-of-view orientation may be provided prior to providing control of the position of the point-of-view location and the orientation of the direction-of-view orientation based on the signalling from the one or more sensors. Thus, control of the point-of-view location and direction-of-view orientation by user movement may be disabled (or restricted to movement/rotation over a smaller area/smaller angular amount) until after the second action to rotate to the compromise direction-of-view orientation.

The apparatus 100 may be configured to determine the compromise direction-of-view orientation as follows. The compromise direction-of-view orientation in the virtual reality space may comprise an orientation determined based on two criteria:

(a) a compromise direction-of-view orientation is an orientation determined based on the direction-of-view orientation at the time the input is received; and
(b) the compromise direction-of-view orientation is an orientation with which the requested point-of-view location is allowed, that is all physical locations within the boundary of the real-world play space relative to the current physical location of the user with the current physical orientation correspond to point-of-view locations in the virtual reality space relative to the requested point-of-view location and with the compromise direction-of-view orientation that are wholly within the defined region 214 of the virtual reality space 200.

FIG. 15 shows the direction-of-view orientation in the virtual reality space having been rotated 1500 to an orientation in which the virtual point-of-view locations reachable by movement in the real-world play space 204 do not lie within non-defined regions 215.

The physical orientation of the user 201 in the real-world play space 204 is unchanged. However, following the change to the compromise direction-of-view orientation, movement of the user in particular directions in play space now result in movement in different directions in the virtual reality space 200. Thus, with reference to FIG. 13, we can assume that an orientation "north" in the real-world play space 204 is mapped to direction defined notionally as north in the virtual space. Thus, we can say that a movement towards the longer edges of the real-world play space 204 results in movement north or south in the virtual reality space 200. However, with reference to FIG. 15, using the compromise direction-of-view orientation, movement towards the longer edges of the real-world play space 204 now results in movement north-west and south-east in the virtual reality space 200.

Thus, the mapping between a location and orientation in the real-world play space 204 and a point-of-view location and direction-of-view orientation in the virtual reality space 200 is changed in addition to changing the point-of-view location to the requested point-of-view location 1311. In the above embodiments, when the orientation of the coordinate system used in the real-world play space 204 was aligned with the coordinate system used in the virtual space, there was provided, as an example to aid understanding, a simple mapping of form [+/−X, +/−Y]. The change in orientation requires a more complex function. Those skilled in the art of coordinate system translation, will appreciate that various techniques may be applied to translate between the coordinate system of the real-world play space 204 and the coordinate system of the virtual reality space 200, such as by using trigonometric functions or the determination of a transformation matrix that provides for the translation. For this example, however, it is sufficient to appreciate that the rotational alignment between the coordinate system of the real-world play space 204 and the coordinate system of the virtual reality space 200 is modified based on the change to the compromise direction-of-view orientation.

With the new mapping established, it may be straightforward to determine if all physical locations within the boundary of the real-world play space 204 relative to the current physical location of the user 201 with their current orientation correspond to point-of-view locations in the virtual reality space relative to said requested point-of-view location that are wholly within the defined region 214 of the virtual reality space 200. That is the requested point-of-view location is allowed when the modified physical orientation to direction-of-view orientation mapping is used. In other examples, rather than determine the mapping first, the direction-of-view orientation may be determined graphically, similar to as depicted in FIG. 15, and then the mapping may be determined therefrom.

The apparatus 100 may then be configured to provide for presentation of a view of the virtual reality space 200 with the requested point-of-view location 1311 and the compromise direction-of-view orientation.

Thus, the apparatus 100 may provide an interface with an effective experience when changing point-of-view locations because the user input is acted upon to move to the requested point-of-view location but with a compromise direction-of-view orientation rather than fail to provide for any movement. Movement to the requested point-of-view location with the compromise direction-of-view orientation may enable continued exploration around the virtual space without interruptions caused by the user not understanding or it being inadequately explained to a user why movement to their requested point-of-view location 1311 with the first direction-of-view was not allowed. In addition, the movement to the requested point-of-view location 1311 prior to modification of the orientation to the compromise direction-of-view orientation may provide convenient feedback to a user to allow them to understand that determination of a compromise direction-of-view orientation has occurred but also the relative difference in orientation between the first direction-of-view orientation immediately before the requested point-of-view location 1311 was made and the compromise direction-of-view orientation.

In one or more examples, the rotation of the direction-of-view orientation to the compromise direction-of-view orientation may be progressively presented to the user by the apparatus 100 as a presentation of the view of the virtual reality space 200 with one or more intermediate direction-of-view orientations between the first direction-of-view orientation and the compromise direction-of-view orientation. Thus, it would appear to the user 201 that they are rotated to the compromise direction-of-view orientation from the direction-of-view orientation they had previously without any physical rotation on their part.

In one or more other examples, the apparatus 100 may be configured to move the point of view location to the requested point-of-view location 1311 and move the direction-of-view orientation to the compromise direction-of-view orientation without first moving to the requested point-of-view location 1311 with the first direction-of-view orientation.

As in the example described in relation to FIGS. 10-12 any other form of feedback indicator may be provided, such as an arrow, message, text or visual effect among other examples.

In a further example embodiment, not shown, the apparatus 100 may be configured to determine a compromise point-of-view location in combination with a compromise direction-of-view orientation that are respectively based on the requested point-of-view location (e.g. closest to it, closest to it within a threshold, closest in a predetermined number of directions) and based on the direction-of-view orientation immediately prior to the request to move to the "not allowed" requested point-of-view location. Thus, it may be that a change from the requested-point-of-view location and the first direction-of-view orientation may lead to a smaller overall change to the mapping function. This may be important because the user 201 may be familiar with seeing some virtual mountains or other features in the virtual space when they look towards a particular wall in their room in which the real-world play space 204 is located. When there is a large change in the mapping of direction-of-view orientation to the physical orientation, this may be disorientating. However, modifying both the point-of-view location in combination with the direction-of-view orientation may reduce disorientation and reduce any potential frustration with not arriving exactly at the requested point-of-view location. Example FIG. 16 illustrate a third example embodiment of the functionality of the apparatus 100.

Figure 16:
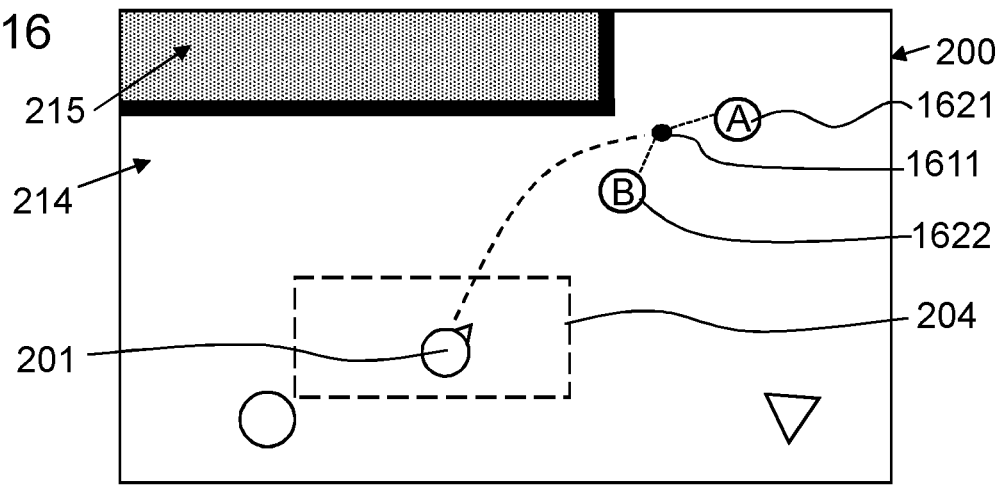
FIG. 16 illustrates a third example embodiment comprising a virtual reality space with the real-world play space overlaid thereon and the input of a requested point-of-view location and the presentation of a plurality of compromise point-of-view locations.

The user 201 is at a first point-of-view location with a first direction-of-view orientation, shown by the position of the user 201 in FIG. 16, and the apparatus 100 and virtual reality apparatus 101 are therefore providing for display of the virtual reality space as it would appear at the point-of-view location. The user 201 has used the controller 106 (or any other input means) to provide input to indicate a requested point-of-view location 1611 to which they want to teleport. Thus, the apparatus 100 receives the requested point-of-view location 1611, comprising the location in the virtual reality space 200 to which the user wishes to teleport, adjacent the non-defined region 215. The apparatus 100 may be configured to determined that a region (not shown in this figure) of the real-world play space 204 would have a corresponding location in the virtual reality space 200 that lies in a non-defined region 215.

Accordingly, the apparatus 100 may be configured to, on determination that the requested point-of-view location 1611 is "not allowed", determine a plurality of different candidate point-of-view locations 1621, 1622 that are at allowed locations.

The plurality of different compromise point-of-view locations may be considered as candidate point-of-view locations 1621, 1622 from which a user can select. The candidate point-of-view locations may be determined in a similar manner to any of the methods described in relation to the description for FIGS. 10 to 12. For example, the apparatus may identify a location to the "south" of the requested point-of-view location 1611 in the virtual space that provides an allowed location, and a location to the "east" in the virtual space that provides an allowed location, while the other directions do not yield an allowable location. Accordingly, the apparatus 100 may be configured to present the determined southerly and easterly locations as the candidate point-of-view locations.

FIG. 16 shows the candidate point-of-view locations as locations labelled "A" and "B". The apparatus 100 may be configured to present a similar plan view of the virtual reality space 200 illustrating the location of the candidate point-of-view locations 1621, 1622 and, optionally, the requested point-of-view location 1611. In other examples, the candidate point-of-view locations 1621, 1622 may be presented in a list. In other examples, the candidate point-of-view locations 1621, 1622 may be displayed overlaid in the view of the virtual space at their virtual locations from the current point-of-view location. Thus, the candidate point-of-view locations may appear as floating pin marks in the user's view of the virtual reality space 200 that may be selectable.

The apparatus 100 may be configured to receive an input indicative of a selection of one of the plurality of compromise point-of-view locations by the user. In response to said selection, the apparatus 100 may provide for presentation, using the virtual reality apparatus 101, of the virtual reality space 200 from the selected candidate point-of-view location 1621 or 1622 in the virtual reality space 200. Thus, the user 201 may be teleported to the selected candidate point-of-view location 1621 or 1622 as soon as their selection is made or within a threshold time of the selection.

Figure 17:
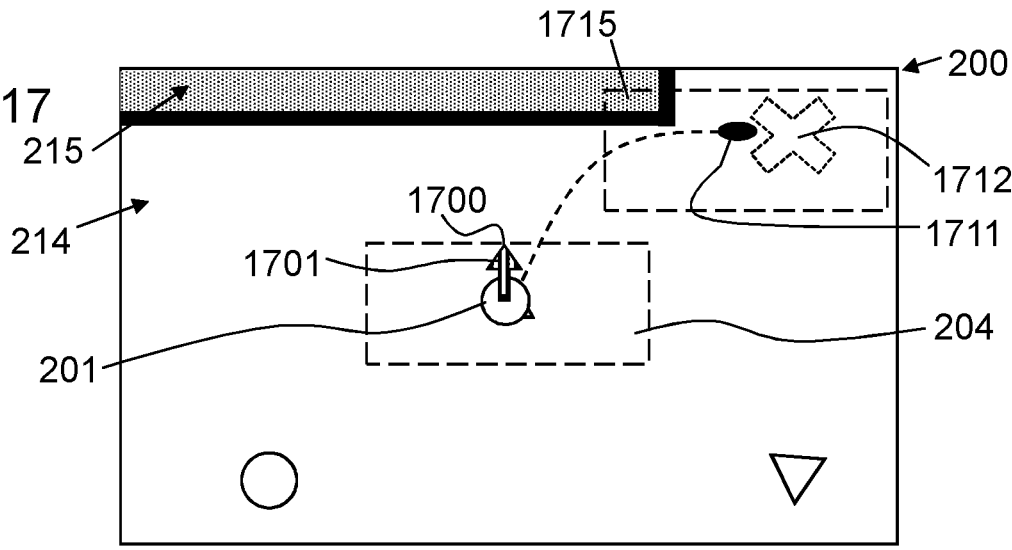
FIG. 17 illustrates a fourth example embodiment comprising a virtual reality space with the real-world play space overlaid thereon and the input of a requested point-of-view location that is determined not to be allowed and the illustration of a compromise physical location.
Figure 18:
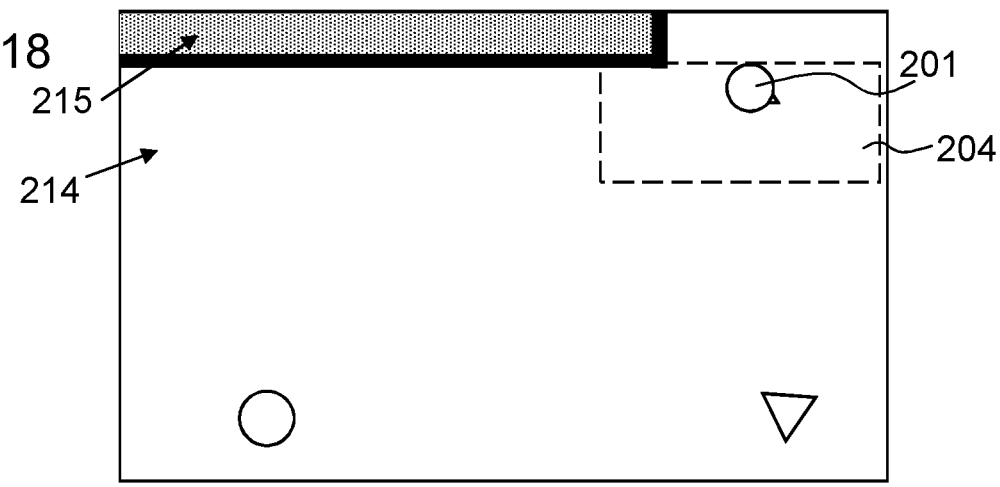
FIG. 18 illustrates the point-of-view location having been placed at a requested point-of-view location but with the user having moved to the compromise physical location.

Example FIGS. 17 and 18 illustrate a fourth example embodiment of the functionality of the apparatus 100.

The user 201 is at a first point-of-view location with a first direction-of-view orientation, shown by the position of the user 201 in FIG. 17, and the apparatus 100 and VR apparatus 101 are therefore providing for display of the virtual reality space as it would appear at the point-of-view location. The user 201 has used the controller 106 (or any other input means) to provide input to indicate a requested point-of-view location 1711 to which they want to teleport. Thus, the apparatus 100 receives the requested point-of-view location 1711, comprising the location in the virtual reality space 200 to which the user wishes to teleport, adjacent the non-defined region 215. The apparatus 100 may be configured to determined that a region 1715 of the real-world play space 204 would have a corresponding location in the virtual reality space 200 that lies in a non-defined region 215.

In this example, the apparatus 100 is configured to determine whether or not the user 201 changing their physical position in the real-world play space 204 would result the requested point-of-view location 1711 being an allowed location. In this example, the apparatus 100 may be configured to determine a compromise physical position, which may require the user to move from their current physical position in the real-world play space before the move to the requested point-of-view location can be completed. It will be appreciated that for a location to be allowed, all physical locations within the real-world play space relative to said physical location of the user correspond to point-of-view locations in the virtual reality space relative to the requested point-of-view locations that are wholly within the defined region of the virtual reality space.

FIG. 17 shows the apparatus 100 having determined the compromise physical position 1700 of the user 201 in the real-world play space 204 at which the requested point-of-view location 1711 is allowed. Thus, by virtue of the user 201 being physically located at the compromise physical position 1700 in the real-world play space 204, the requested point-of-view location 1711 is allowed because all physical locations within the real-world play space 204 relative to the compromise physical position 1700 of the user 201 correspond to point-of-view locations in the virtual reality space 200 relative to said requested point-of-view location that are wholly within the defined region 214 of the virtual reality space 200.

In one or more examples, the apparatus 100 may be configured to, following the determination of the compromise physical position 1700, provide for presentation of guidance 1701 for the user to guide them to the compromise physical position. The guidance 1701 may comprise an arrow, as shown in FIG. 17, which may be presented on a plan view of the real-world play space 204 or in the user's view of the virtual space using the virtual reality apparatus 201. In other examples, the guidance may comprise a voice command to tell the user 201 to move at least in a particular direction or to the compromise physical position.

Example FIG. 18 show the user having changed their physical location in the real-world play space 204. The one or more sensors may be configured to provide the physical location to the apparatus 100. Accordingly, the apparatus 100 may receive information to determine when the guiding instructions provided to the user have been followed. Once the user 201 is at the compromise physical position 1700, the point-of-view location can be placed at the requested point-of-view location 1711, as shown in FIG. 18. In FIG. 18, the user 201 is at the requested point-of-view location 1711 in the virtual reality space 200 and the compromise physical position 1700, which happens to be at the edge of the real-world play space 204, in the real-world play space 204.

In one or more examples, the apparatus 100 may be configured to, on determination that the requested point-of-view location 1711 is not allowed, provide for display of a graphic to indicate as such. Thus, an "X" 1712 or other symbol may be presented to the user in any of the examples herein.

Figure 19:
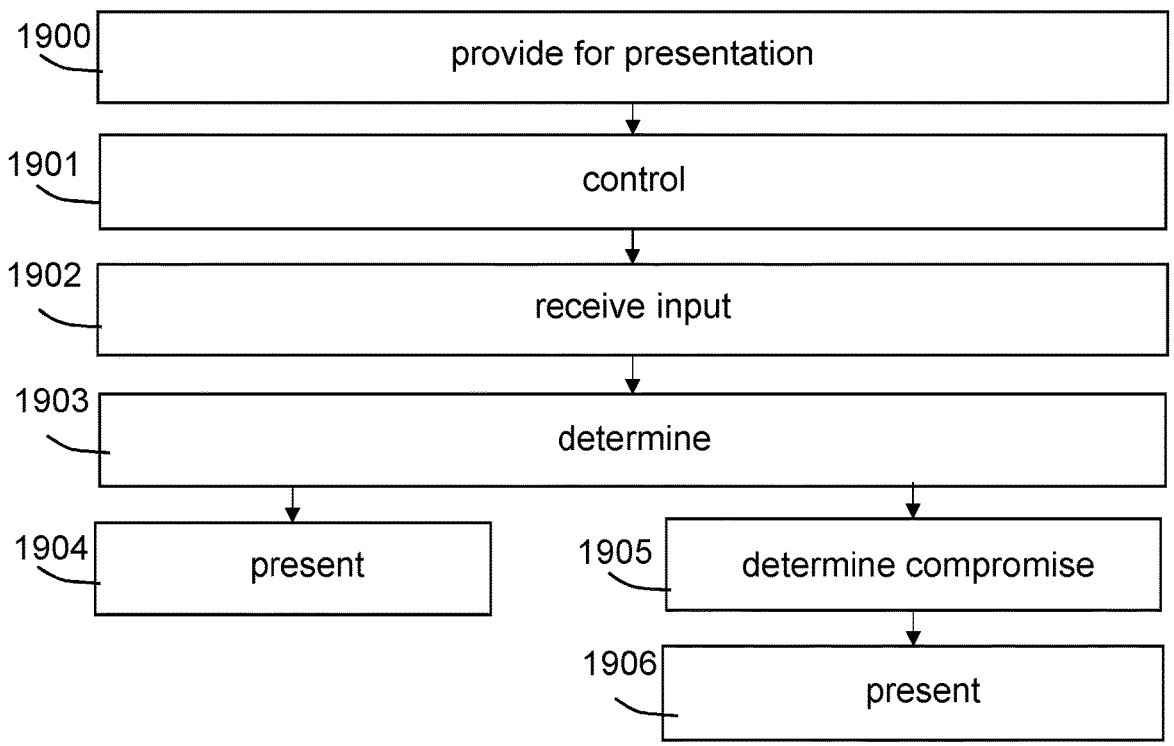
FIG. 19 shows a flowchart illustrating an example method.

FIG. 19 shows a flow diagram illustrating the steps of,
  providing for presentation 1900, using a virtual reality apparatus, of a virtual reality space from a point-of-view location in the virtual reality space and with a direction-of-view orientation in the virtual reality space, the virtual reality space having at least one defined region and at least one non-defined region;
  controlling 1901 the position of the point-of-view location and the direction-of-view orientation in the virtual reality space based on signalling from one or more sensors configured to determine a respective and corresponding physical position and physical orientation of a user within a boundary of a real-world play space;
  receiving input 1902 to move the point-of-view location in the virtual reality space to a requested point-of-view location by means other than said sensed physical position and physical orientation of the user in the real-world play space;
  determining 1903 if the requested point-of-view location is allowed or not allowed based on information indicative of the current physical location of the user in the real-world play space and the boundary of the real-world play space, wherein a location in the virtual space is not allowed if any physical locations within the boundary of the real-world play space relative to the current physical location of the user correspond to point-of-view locations in the virtual reality space relative to said location in the virtual space that lie within a non-defined region of the virtual reality space, and wherein a location in the virtual space is allowed if all physical locations within the boundary of the real-world play space relative to the current physical location of the user correspond to point-of-view locations in the virtual reality space relative to said location in the virtual space that are wholly within the defined region of the virtual reality space, and
  if the requested point-of-view location is not allowed, determining 1905 at least one of:
    (i) a compromise point-of-view location in the virtual reality space comprising a location in the virtual reality space determined based on the requested point-of-view location and that is allowed;
    (ii) a compromise direction-of-view orientation in the virtual reality space comprising an orientation determined based on the direction-of-view orientation at the time the input is received and with which the requested point-of-view location is allowed;
    (iii) a compromise point-of-view location and a compromise direction-of-view orientation in the virtual reality space comprising a location and orientation determined based on the requested point-of-view location and the direction-of-view orientation at the time the input is received and wherein the compromise point-of-view location in combination with the compromise direction-of-view orientation is allowed;
    (iv) a compromise physical position of the user in the real-world play space at which the requested point-of-view location is allowed, wherein the requested point-of-view location is allowed if all physical locations within the boundary of the real-world play space relative to the compromise physical location of the user correspond to point-of-view locations in the virtual reality space that are wholly within the defined region of the virtual reality space;
  and providing for presentation 1906, using the virtual reality apparatus, of the virtual reality space respectively from the at least one of (i) compromise point-of-view location in the virtual reality space, (ii) requested point-of-view location with the compromise direction-of-view orientation; (iii) compromise point-of-view location with the compromise direction-of-view orientation and (iv) the requested point-of-view location based on signalling indicative of the user having moved to the compromise physical position.

If the method determines that the requested point-of-view location is allowed, the method comprises the step of providing for presentation 1904, using the virtual reality apparatus, of the virtual reality space from the requested point-of-view location in the virtual reality space.

Figure 20:
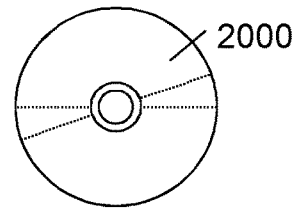
FIG. 20 shows a computer readable medium.

FIG. 20 illustrates schematically a computer/processor readable medium 2000 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising
at least one processor; and
at least one memory including computer program code;
the at least one memory and the computer program code configured to, with the at least one processor, cause the apparatus at least to perform:
cause presentation of a virtual reality space from a point-of-view location in the virtual reality space and with a direction-of-view orientation in the virtual reality space, the virtual reality space having at least one defined region and at least one non-defined region;
control the position of the point-of-view location and the direction-of-view orientation in the virtual reality space based on data received from one or more sensors configured to determine a respective and corresponding physical position and physical orientation of a user within a boundary of a real-world play space;
receive an indication of an input to move the point-of-view location in the virtual reality space to a requested point-of-view location, where-in the input is other than the sensed physical position or physical orientation of the user in the real-world play space;

determine if the requested point-of-view location is allowed or not allowed based on information indicative of the current physical location of the user in the real-world play space and the boundary of the real-world play space, wherein a location in the virtual space is not allowed if any physical locations within the boundary of the real-world play space relative to the current physical location of the user correspond to point-of-view locations in the virtual reality space relative to the location in the virtual space that lie within a non-defined region of the virtual reality space, and wherein a location in the virtual space is allowed if all physical locations within the boundary of the real-world play space relative to the current physical location of the user correspond to point-of-view locations in the virtual reality space relative to the location in the virtual space that are wholly within the defined region of the virtual reality space, and determine the requested point-of-view location is not allowed, and in response thereto, determine at least one of:

(a) a compromise point-of-view location in the virtual reality space comprising a location in the virtual reality space determined based on the requested point-of-view location and that is allowed;

(b) a compromise direction-of-view orientation in the virtual reality space comprising an orientation determined based on the direction-of-view orientation at the time the input is received and with which the requested point-of-view location is allowed; or (c) a compromise point-of-view location and a compromise direction-of-view orientation in the virtual reality space comprising a location and orientation determined based on the requested point-of-view location and the direction-of-view orientation at the time the input is received and wherein the compromise point-of-view location in combination with the compromise direction-of-view orientation is allowed;

further in response to determining the requested point-of-view location is not allowed, determine a compromise physical position of the user in the real-world play space at which the requested point-of-view location is allowed, wherein the requested point-of-view location is allowed if all physical locations within the boundary of the real-world play space relative to the compromise physical location of the user correspond to point-of-view locations in the virtual reality space that are wholly within the defined region of the virtual reality space;

cause presentation of guidance for the user to move to the compromise physical position; and in response to determining the user has moved to the compromise physical position, cause presentation of the virtual reality space respectively from the at least one of the compromise point-of-view location in the virtual reality space, requested point-of-view location with the compromise direction-of-view orientation or compromise point-of-view location with the compromise direction-of-view orientation or the requested point-of-view location.

2. The apparatus according to claim 1, wherein the at least one memory and the computer program code are further configured to cause the apparatus to present an indicator indicating the difference between the at least one of:
the compromise point-of-view location and the requested point-of-view location; the compromise direction-of-view orientation and the direction-of-view orientation at the time the input is received; or
the compromise point-of-view location and the requested point-of-view location; and the compromise direction-of-view orientation and the direction-of-view orientation at the time the input is received.

3. The apparatus according to claim 2, wherein the at least one memory and the computer program code are further configured to, with the at least one processor, cause the apparatus at least to cause display of the virtual reality space from the at least one of the compromise point-of-view location in the virtual reality space, requested point-of-view location with the compromise direction-of-view orientation or the compromise point-of-view location and with the compromise direction-of-view orientation.

4. The apparatus according to claim 1, wherein the apparatus is configured to provide for presentation of the virtual reality space from the not allowed, requested point-of-view location in the virtual reality space; and
prior to providing control of the position of the point-of-view location and the orientation of the direction-of-view orientation, provide for the at least one of:
presentation of the virtual reality space from the compromise point-of-view location in the virtual reality space;
presentation of the virtual reality space with the compromise direction-of-view orientation in the virtual reality space; or
presentation of the virtual reality space with the compromise point-of-view location and the compromise direction-of-view orientation in the virtual reality space.

5. The apparatus according to claim 1, wherein the apparatus is configured to: determine a plurality of different compromise point-of-view locations;
receive an input indicative of a selection of one of the plurality of compromise point-of-view locations by the user; and
following the selection, provide for presentation of the virtual reality space from the selected compromise point-of-view location in the virtual reality space.

6. The apparatus according to claim 1, wherein at least one of:
the compromise point-of-view location comprises a location closest to the requested point-of-view location and that is allowed;
the compromise direction-of-view orientation comprises an orientation closest to the direction-of-view orientation at the time the input is received and with which the requested point-of-view location is allowed;
the combination of the compromise point-of-view location and the compromise direction-of-view orientation comprise the location and orientation closest to the requested point-of-view location and closest to the direction-of-view orientation at the time the input is received and wherein the compromise point-of-view location in combination with the compromise direction-of-view orientation is allowed; or
the compromise physical position of the user in the real-world play space comprises a position closest to the physical position of the user at the time the input is received and at which the requested point-of-view location is allowed.

7. The apparatus according to claim 1, wherein the input to move the point-of-view location in the virtual reality space to the requested point-of-view location is received from a hand-held controller which comprises part of the apparatus.

8. The apparatus according to claim 1, wherein the apparatus is configured to provide for presentation of the virtual reality space from the requested point-of-view location in the virtual reality space if it is determined that the requested point-of-view location is allowed.

9. The apparatus according to claim 1, wherein the apparatus forms part of a virtual reality apparatus.

10. A method, the method comprising:
causing presentation of a virtual reality space from a point-of-view location in the virtual reality space and with a direction-of-view orientation in the virtual reality space, the virtual reality space having at least one defined region and at least one non-defined region;
controlling the position of the point-of-view location and the direction-of-view orientation in the virtual reality space based on data received from one or more sensors configured to determine a respective and corresponding physical position and physical orientation of a user within a boundary of a real-world play space;
receiving an indication of an input to move the point-of-view location in the virtual reality space to a requested point-of-view location, wherein the input is other than the sensed physical position or physical orientation of the user in the real-world play space;
determining if the requested point-of-view location is allowed or not allowed based on information indicative of the current physical location of the user in the real-world play space and the boundary of the real-world play space, wherein a location in the virtual space is not allowed if any physical locations within the boundary of the real-world play space relative to the current physical location of the user correspond to point-of-view locations in the virtual reality space relative to the location in the virtual space that lie within a non-defined region of the virtual reality space, and wherein a location in the virtual space is allowed if all physical locations within the boundary of the real-world play space relative to the current physical location of the user correspond to point-of-view locations in the virtual reality space relative to the location in the virtual space that are wholly within the defined region of the virtual reality space, and
determining the requested point-of-view location is not allowed, and in response thereto, determining at least one of:
(a) a compromise point-of-view location in the virtual reality space comprising a location in the virtual reality space determined based on the requested point-of-view location and that is allowed;
(b) a compromise direction-of-view orientation in the virtual reality space comprising an orientation determined based on the direction-of-view orientation at the time the input is received and with which the requested point-of-view location is allowed; or
(c) a compromise point-of-view location and a compromise direction-of-view orientation in the virtual reality space comprising a location and orientation determined based on the requested point-of-view location and the direction-of-view orientation at the time the input is received and wherein the compromise point-of-view location in combination with the compromise direction-of-view orientation is allowed;
further in response to determining the requested point-of-view location is not allowed, determining a compromise physical position of the user in the real-world play space at which the requested point-of-view location is allowed, wherein the requested point-of-view location is allowed if all physical locations within the boundary of the real-world play space relative to the compromise physical location of the user correspond to point-of-view locations in the virtual reality space that are wholly within the defined region of the virtual reality space;
causing presentation of guidance for the user to move to the compromise physical position; and
in response to determining the user has moved to the compromise physical position, causing presentation of the virtual reality space respectively from the at least one of the compromise point-of-view location in the virtual reality space, requested point-of-view location with the compromise direction-of-view orientation, or compromise point-of-view location with the compromise direction-of-view orientation or the requested point-of-view location.

11. The method according to claim 10, further comprising causing display of an indicator indicating the difference between the at least one of:
the compromise point-of-view location and the requested point-of-view location;
the compromise direction-of-view orientation and the direction-of-view orientation at the time the input is received; or
the compromise point-of-view location and the requested point-of-view location; and the compromise direction-of-view orientation and the direction-of-view orientation at the time the input is received.

12. The method according to claim 11, wherein the presentation of the indicator is provided after the presentation of the virtual reality space from the at least one of compromise point-of-view location in the virtual reality space, requested point-of-view location with the compromise direction-of-view orientation or the compromise point-of-view location and with the compromise direction-of-view orientation.

13. The method according to claim 10, further comprising:
providing for presentation, of the virtual reality space from the not allowed, requested point-of-view location in the virtual reality space; and
prior to providing control of the position of the point-of-view location and the orientation of the direction-of-view orientation providing for the at least one of:
presentation, of the virtual reality space from the compromise point-of-view location in the virtual reality space;
presentation, of the virtual reality space with the compromise direction-of-view orientation in the virtual reality space; or
presentation, of the virtual reality space with the compromise point-of-view location and the compromise direction-of-view orientation in the virtual reality space.

14. The method according to claim 10, comprising
determining a plurality of different compromise point-of-view locations;
receiving an input indicative of a selection of one of the plurality of compromise point-of-view locations by the user; and
following the selection, provide for presentation of the virtual reality space from the selected compromise point-of-view location in the virtual reality space.

15. The method according to claim 10, wherein at least one of:

the compromise point-of-view location comprises a location closest to the requested point-of-view location and that is allowed;

the compromise direction-of-view orientation comprises an orientation closest to the direction-of-view orientation at the time the input is received and with which the requested point-of-view location is allowed; the combination of the compromise point-of-view location and the compromise direction-of-view orientation comprise the location and orientation closest to the requested point-of-view location and closest to the direction-of-view orientation at the time the input is received and wherein the compromise point-of-view location in combination with the compromise direction-of-view orientation is allowed; or the compromise physical position of the user in the real-world play space comprises a position closest to physical position of the user at the time the input is received and at which the requested point-of-view location is allowed.

16. A non-transitory computer readable medium comprising program instructions stored thereon for performing at least the following:

provide for presentation of a virtual reality space from a point-of-view location in the virtual reality space and with a direction-of-view orientation in the virtual reality space, the virtual reality space having at least one defined region and at least one non-defined region;

control the position of the point-of-view location and the direction-of-view orientation in the virtual reality space based on data received from one or more sensors configured to determine a respective and corresponding physical position and physical orientation of a user within a boundary of a real-world play space;

receive an indication of an input to move the point-of-view location in the virtual reality space to a requested point-of-view location, wherein the input is other than the sensed physical position or physical orientation of the user in the real-world play space;

determine if the requested point-of-view location is allowed or not allowed based on information indicative of the current physical location of the user in the real-world play space and the boundary of the real-world play space, wherein a location in the virtual space is not allowed if any physical locations within the boundary of the real-world play space relative to the current physical location of the user correspond to point-of-view locations in the virtual reality space relative to the location in the virtual space that lie within a non-defined region of the virtual reality space, and wherein a location in the virtual space is allowed if all physical locations within the boundary of the real-world play space relative to the current physical location of the user correspond to point-of-view locations in the virtual reality space relative to the location in the virtual space that are wholly within the defined region of the virtual reality space, and determine the requested point-of-view location is not allowed, and in response thereto, determine at least one of:

(a) a compromise point-of-view location in the virtual reality space comprising a location in the virtual reality space determined based on the requested point-of-view location and that is allowed;

(b) a compromise direction-of-view orientation in the virtual reality space comprising an orientation determined based on the direction-of-view orientation at the time the input is received and with which the requested point-of-view location is allowed; or (c) a compromise point-of-view location and a compromise direction-of-view orientation in the virtual reality space comprising a location and orientation determined based on the requested point-of-view location and the direction-of-view orientation at the time the input is received and wherein the compromise point-of-view location in combination with the compromise direction-of-view orientation is allowed;

further in response to determining the requested point-of-view location is not allowed, determine a compromise physical position of the user in the real-world play space at which the requested point-of-view location is allowed, wherein the requested point-of-view location is allowed if all physical locations within the boundary of the real-world play space relative to the compromise physical location of the user correspond to point-of-view locations in the virtual reality space that are wholly within the defined region of the virtual reality space;

cause presentation of guidance for the user to move to the compromise physical position; and in response to determining the user has moved to the compromise physical position, cause presentation of the virtual reality space respectively from the at least one of the compromise point-of-view location in the virtual reality space, requested point-of-view location with the compromise direction-of-view orientation; or compromise point-of-view location with the compromise direction-of-view orientation or the requested point-of-view location.

* * * * *

UNITED STATES PATENT AND TRADEMARK OFFICE
CERTIFICATE OF CORRECTION

PATENT NO. : 11,169,598 B2
APPLICATION NO. : 16/733548
DATED : November 9, 2021
INVENTOR(S) : Leppanen et al.

Page 1 of 1

It is certified that error appears in the above-identified patent and that said Letters Patent is hereby corrected as shown below:

In the Claims

Column 29,
Line 58, "orientation or" should read --orientation, or--.

Column 32,
Line 47, "orientation providing" should read --orientation, providing--.

Column 34,
Line 6, "space, and" should read --space,--.

Signed and Sealed this
Twenty-fifth Day of October, 2022

Katherine Kelly Vidal
*Director of the United States Patent and Trademark Office*